(12) United States Patent
Chang et al.

(10) Patent No.: US 10,191,247 B2
(45) Date of Patent: Jan. 29, 2019

(54) IMAGING LENS HAVING FOUR LENS ELEMENTS, AND ELECTRONIC APPARATUS HAVING THE SAME

(71) Applicant: GENIUS ELECTRONIC OPTICAL CO., LTD., Taichung (TW)

(72) Inventors: Kuo-Wen Chang, Taichung (TW); Poche Lee, Taichung (TW); Wei-Yu Lo, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/942,428

(22) Filed: Nov. 16, 2015

(65) Prior Publication Data
US 2016/0187618 A1   Jun. 30, 2016

Related U.S. Application Data

(63) Continuation of application No. 13/738,313, filed on Jan. 10, 2013, now Pat. No. 9,217,845.

(30) Foreign Application Priority Data

Aug. 27, 2012   (TW) .............................. 101130990 A

(51) Int. Cl.
| G02B 13/00 | (2006.01) |
| G02B 13/18 | (2006.01) |
| G02B 9/34  | (2006.01) |
| H04N 5/225 | (2006.01) |
| G02B 7/02  | (2006.01) |

(52) U.S. Cl.
CPC ........... *G02B 13/004* (2013.01); *G02B 7/021* (2013.01); *G02B 9/34* (2013.01); *G02B 13/18* (2013.01); *H04N 5/2252* (2013.01); *H04N 5/2254* (2013.01)

(58) Field of Classification Search
CPC ...... G02B 13/004; G02B 9/34; G02B 13/005; G02B 13/02; G02B 13/18
USPC ......................................... 359/715, 771–774
See application file for complete search history.

(56) References Cited

U.S. PATENT DOCUMENTS

| 5,283,693 A   | * | 2/1994  | Kohno    | ................. | G02B 15/177 |
|               |   |         |          |                   | 359/691     |
| 6,040,949 A   | * | 3/2000  | Ohno     | ................. | G02B 15/177 |
|               |   |         |          |                   | 359/682     |
| 7,952,818 B1  | * | 5/2011  | Huang    | ................. | G02B 13/004 |
|               |   |         |          |                   | 359/715     |
| 2008/0266676 A1 | * | 10/2008 | Yasuhiko | ................. | G02B 9/34   |
|               |   |         |          |                   | 359/708     |

(Continued)

FOREIGN PATENT DOCUMENTS

JP   2012-159620   * 8/2012

*Primary Examiner* — Jordan Schwartz
(74) *Attorney, Agent, or Firm* — Kilpatrick Townsend and Stockton LLP

(57) ABSTRACT

An imaging lens includes first, second, third, and fourth lens elements arranged from an object side to an image side in the given order. The first lens element has an image-side surface with a concave portion in the vicinity of its periphery. The second lens element has an image-side surface with a convex portion in the vicinity of the optical axis. The third lens element has a positive refractive power. The imaging lens does not have any lens element with refractive power other than the first, second, third, and fourth lens elements.

17 Claims, 36 Drawing Sheets

(56) References Cited

U.S. PATENT DOCUMENTS

| | | | | |
|---|---|---|---|---|
| 2010/0020417 A1* | 1/2010 | Lin | ............. | G02B 13/18 |
| | | | | 359/715 |
| 2010/0020418 A1* | 1/2010 | Onoda | ............. | G02B 9/34 |
| | | | | 359/715 |
| 2010/0073779 A1* | 3/2010 | Wang | ............. | G02B 9/34 |
| | | | | 359/715 |
| 2011/0122510 A1* | 5/2011 | Uchida | ............. | G02B 13/16 |
| | | | | 359/716 |
| 2012/0113310 A1* | 5/2012 | Huang | ............. | G02B 13/004 |
| | | | | 348/340 |
| 2013/0057969 A1* | 3/2013 | Lai | ............. | G02B 13/004 |
| | | | | 359/715 |
| 2013/0208354 A1* | 8/2013 | Tsai | ............. | G02B 13/004 |
| | | | | 359/357 |
| 2013/0208365 A1* | 8/2013 | Hsu | ............. | G02B 13/02 |
| | | | | 359/715 |
| 2014/0078581 A1* | 3/2014 | Tsai | ............. | G02B 13/14 |
| | | | | 359/357 |
| 2014/0085712 A1* | 3/2014 | Tsai | ............. | G02B 15/16 |
| | | | | 359/357 |
| 2014/0098432 A1* | 4/2014 | Kubota | ............. | G02B 13/004 |
| | | | | 359/781 |

* cited by examiner

FIG. 2 system focal length =2.01mm, half field-of-view =33.54°, system length=2.50mm

| lens element | surface | radius of curvature | thickness | refractive index | Abbe number | material | focal length |
|---|---|---|---|---|---|---|---|
| object | | ∞ | | | | | |
| aperture stop 2 | | ∞ | −0.120 | | | | |
| first lens element 3 | object-side surface 31 | 0.873 | 0.494 | 1.546 | 56.114 | plastic | 1.973 |
| | image-side surface 32 | 3.676 | 0.123 | | | | |
| second lens element 4 | object-side surface 41 | −2.330 | 0.247 | 1.655 | 21.448 | plastic | −4.401 |
| | image-side surface 42 | −12.823 | 0.100 | | | | |
| third lens element 5 | object-side surface 51 | −1.601 | 0.411 | 1.536 | 55.699 | plastic | 1.991 |
| | image-side surface 52 | −0.638 | 0.100 | | | | |
| fourth lens element 6 | object-side surface 61 | 0.768 | 0.227 | 1.536 | 55.699 | plastic | −2.781 |
| | image-side surface 62 | 0.455 | 0.300 | | | | |
| Optical filter 7 | object-side surface 71 | ∞ | 0.210 | | | | |
| | image-side surface 72 | ∞ | 0.412 | | | | |
| image plane 8 | | ∞ | 0.046 | | | | |

| surface | 31 | 32 | 41 | 42 | 51 | 52 | 61 | 62 |
|---|---|---|---|---|---|---|---|---|
| NRADIUS | 8.727E-01 | 3.670E+00 | -2.330E+00 | -1.262E+01 | -1.601E+00 | -6.979E-01 | 7.683E-01 | 4.549E-01 |
| K | 4.213E-01 | 5.213E-01 | 5.944E-01 | 4.963E-01 | 6.554E-01 | 6.975E-01 | 1.080E+00 | 1.107E+00 |
| a | -7.473E+00 | 0.000E+00 | -2.089E+01 | 0.000E+00 | -1.675E+01 | -3.808E-01 | -7.676E+00 | -3.268E+00 |
| a | 3.258E-02 | -1.118E-02 | -1.132E-01 | 2.061E-03 | 8.645E-03 | 1.013E-01 | -6.849E-01 | -7.215E-01 |
| a | -1.111E-03 | 6.706E-04 | 1.165E-02 | -3.594E-03 | -1.551E-02 | 2.529E-02 | 2.606E-01 | 1.243E-01 |
| a | 1.466E-04 | 1.433E-03 | 4.833E-03 | 1.704E-03 | 2.399E-03 | 6.647E-03 | -4.193E-02 | -3.180E-02 |
| a | 0.000E+00 | 0.000E+00 | -5.295E-04 | -4.411E-04 | -3.821E-03 | -8.695E-04 | -2.005E-02 | 1.436E-02 |
| a | 0.000E+00 | 0.000E+00 | 0.000E+00 | 6.122E-05 | 7.543E-04 | -4.790E-04 | -2.155E-02 | -9.527E-04 |
| a | 0.000E+00 | 0.000E+00 | 0.000E+00 | 0.000E+00 | 0.000E+00 | 0.000E+00 | -9.215E-03 | 1.584E-03 |

FIG. 3

| system focal length=2.10mm , half field of view=32.24°, system length=2.57mm | | | | | | |
|---|---|---|---|---|---|---|
| lens element | surface | radius of curvature | thickness | refractive index | Abbe number | material | focal length |
| object | | ∞ | | | | | |
| aperture stop 2 | | ∞ | -0.128 | | | | |
| first lens element 3 | object-side surface 31 | 0.899 | 0.436 | 1.546 | 56.114 | plastic | 2.015 |
| | image-side surface 32 | 4.069 | 0.124 | | | | |
| second lens element 4 | object-side surface 41 | -2.349 | 0.282 | 1.655 | 21.448 | plastic | -4.452 |
| | image-side surface 42 | -12.623 | 0.100 | | | | |
| third lens element 5 | object-side surface 51 | -1.604 | 0.408 | 1.536 | 55.699 | plastic | 2.039 |
| | image-side surface 52 | -0.708 | 0.191 | | | | |
| fourth lens element 6 | object-side surface 61 | 0.663 | 0.300 | 1.536 | 55.699 | plastic | -2.857 |
| | image-side surface 62 | 0.419 | 0.210 | | | | |
| Optical filter 7 | object-side surface 71 | ∞ | 0.550 | | | | |
| | image-side surface 72 | ∞ | 0.075 | | | | |
| image plane 8 | | ∞ | | | | | |

FIG. 7

| surface | 31 | 32 | 41 | 42 | 51 | 52 | 61 | 62 |
|---|---|---|---|---|---|---|---|---|
| NRADIUS | 8.989E-01 | 4.069E+00 | -2.349E+00 | -1.262E+01 | -1.604E+00 | -7.081E-01 | 6.677E-01 | 4.185E-01 |
| K | 4.251E-01 | 5.130E-01 | 6.026E-01 | 5.012E-01 | 6.448E-01 | 6.952E-01 | 1.071E+00 | 1.086E+00 |
| a₁ | -7.473E+00 | 0.000E+00 | -2.089E-01 | 0.000E+00 | -1.675E+01 | -3.950E-01 | -7.676E+00 | -3.739E+00 |
| a₂ | 3.159E-02 | -1.622E-02 | -1.068E-01 | 3.534E-03 | -2.025E-03 | 1.030E-01 | -6.829E-01 | -6.880E-01 |
| a₃ | -1.119E-03 | -2.387E-03 | 8.979E-03 | -3.882E-03 | -1.233E-02 | 2.672E-02 | 2.727E-01 | 1.198E-01 |
| a₄ | 1.355E-04 | 7.722E-04 | 5.285E-03 | 1.729E-03 | 2.423E-03 | 6.301E-03 | -4.723E-02 | -2.821E-02 |
| a₅ | 0.000E+00 | 0.000E+00 | 1.905E-05 | -4.311E-04 | -3.681E-03 | -2.196E-04 | -1.833E-02 | 1.761E-02 |
| a₆ | 0.000E+00 | 0.000E+00 | 0.000E+00 | 6.139E-05 | 4.394E-04 | -4.647E-04 | -2.344E-02 | -2.830E-04 |
| a₇ | 0.000E+00 | 0.000E+00 | 0.000E+00 | 0.000E+00 | 0.000E+00 | 0.000E+00 | -6.079E-03 | 2.237E-03 |

| lens element | surface | radius of curvature | thickness | refractive index | Abbe number | material | focal length |
|---|---|---|---|---|---|---|---|
| \multicolumn{8}{|l|}{system focal length=1.94mm ; half field-of-view=34.48° ; system length=2.46mm} |
| object | | ∞ | -0.108 | | | | |
| aperture stop 2 | | ∞ | 0.416 | | | | |
| first lens element 3 | object-side surface 31 | 0.882 | 0.416 | 1.546 | 56.114 | plastic | 1.807 |
| | image-side surface 32 | 4.953 | 0.167 | | | | |
| second lens element 4 | object-side surface 41 | -2.145 | 0.384 | 1.650 | 21.448 | plastic | -4.001 |
| | image-side surface 42 | -12.623 | 0.100 | | | | |
| third lens element 5 | object-side surface 51 | -1.732 | 0.301 | 1.536 | 55.699 | plastic | 1.977 |
| | image-side surface 52 | -0.698 | 0.193 | | | | |
| fourth lens element 6 | object-side surface 61 | 0.957 | 0.274 | 1.536 | 55.699 | plastic | -2.359 |
| | image-side surface 62 | 0.419 | 0.300 | | | | |
| Optical filter 7 | object-side surface 71 | ∞ | 0.210 | | | | |
| | image-side surface 72 | ∞ | 0.220 | | | | |
| image plane 8 | | ∞ | 0.02737 | | | | |

| surface | 31 | 32 | 41 | 42 | 51 | 52 | 61 | 62 |
|---|---|---|---|---|---|---|---|---|
| NRADIUS | 8.820E-01 | 4.953E+00 | -2.145E+00 | -1.262E+01 | -1.732E+00 | -6.976E-01 | 9.575E-01 | 4.900E-01 |
| K | 4.233E-01 | 5.123E-01 | 5.947E-01 | 5.334E-01 | 7.140E-01 | 7.028E-01 | 1.077E+00 | 1.164E+00 |
| a₂ | -7.473E+00 | 0.000E+00 | -2.089E+01 | 0.000E+00 | -1.675E+01 | -3.400E-01 | -7.670E+00 | -3.268E+00 |
| a₃ | 3.201E-02 | -1.570E-02 | -1.177E-01 | 8.380E-03 | 8.664E-04 | 9.357E-02 | -5.373E-01 | -6.251E-01 |
| a₄ | -1.278E-03 | -1.823E-03 | 8.611E-03 | -4.105E-03 | -1.179E-02 | 2.381E-02 | 2.246E-01 | 1.213E-01 |
| a₅ | 1.517E-04 | 4.889E-04 | 5.980E-03 | 1.662E-03 | 5.198E-03 | 7.218E-03 | -3.847E-02 | -2.637E-02 |
| a₆ | 0.000E+00 | 0.000E+00 | 9.177E-04 | -3.874E-04 | -4.068E-03 | -1.252E-03 | -1.896E-02 | 1.095E-02 |
| a₇ | 0.000E+00 | 0.000E+00 | 0.000E+00 | 6.947E-05 | 1.190E-03 | -4.947E-04 | -2.477E-02 | 1.689E-04 |
| a₈ | 0.000E+00 | 0.000E+00 | 0.000E+00 | 0.000E+00 | 0.000E+00 | 0.000E+00 | -9.611E-03 | 1.257E-03 |

| lens element | surface | radius of curvature | thickness | refractive index | Abbe number | material | focal length |
|---|---|---|---|---|---|---|---|
| object | | ∞ | | | | | |
| aperture stop 2 | | ∞ | −0.119 | | | | |
| first lens element 3 | object-side surface 31 | 0.888 | 0.401 | 1.546 | 56.114 | plastic | 1.941 |
| | image-side surface 32 | 4.006 | 0.173 | | | | |
| second lens element 4 | object-side surface 41 | −2.222 | 0.180 | 1.655 | 21.448 | plastic | −4.143 |
| | image-side surface 42 | −12.023 | 0.159 | | | | |
| third lens element 5 | object-side surface 51 | −1.704 | 0.474 | 1.536 | 55.699 | plastic | 1.912 |
| | image-side surface 52 | −0.702 | 0.100 | | | | |
| fourth lens element 6 | object-side surface 61 | 0.888 | 0.255 | 1.536 | 55.699 | plastic | −2.014 |
| | image-side surface 62 | 0.489 | 0.300 | | | | |
| Optical filter 7 | object-side surface 71 | ∞ | 0.210 | | | | |
| | image-side surface 72 | ∞ | 0.399 | | | | |
| image plane 8 | | ∞ | 0.041 | | | | | system focal length=2.03mm, half field-of-view=33.85°, system length=2.56mm

| surface | 31 | 32 | 41 | 42 | 51 | 52 | 61 | 62 |
|---|---|---|---|---|---|---|---|---|
| NRADIUS | 8.879E-01 | 4.806E+00 | -2.222E+00 | -1.262E+01 | -1.704E+00 | -7.024E-01 | 8.884E-01 | 4.894E-01 |
| K | 4.230E-01 | 5.098E-01 | 5.972E-01 | 5.282E-01 | 7.119E-01 | 7.031E-01 | 1.092E+00 | 1.137E+00 |
| a2 | -7.473E+00 | 0.000E+00 | -2.089E+01 | 0.000E+00 | -1.673E+01 | -3.557E-01 | -7.676E+00 | -3.268E+00 |
| a3 | 3.209E-02 | -1.575E-02 | -1.148E-01 | 4.295E-03 | -1.286E-02 | 9.914E-02 | -5.998E-01 | -7.340E-01 |
| a4 | -1.272E-03 | -3.779E-03 | 6.332E-03 | -2.986E-03 | -7.882E-03 | 2.260E-02 | 2.381E-01 | 1.190E-01 |
| a5 | 1.298E-04 | 2.826E-05 | 8.123E-03 | 1.566E-03 | 2.857E-03 | 5.392E-03 | -3.973E-02 | -2.109E-02 |
| a6 | 0.000E+00 | 0.000E+00 | 1.176E-03 | -1.085E-04 | -6.087E-04 | 7.429E-04 | -2.298E-02 | 1.884E-02 |
| a7 | 0.000E+00 | 0.000E+00 | 0.000E+00 | 8.184E-05 | 7.124E-04 | -8.224E-06 | -2.129E-02 | -1.459E-04 |
| a8 | 0.000E+00 | 0.000E+00 | 0.000E+00 | 0.000E+00 | 0.000E+00 | 0.000E+00 | -6.294E-03 | 1.732E-03 |

| lens element | surface | radius of curvature | thickness | refractive index | Abbe number | material | focal length |
|---|---|---|---|---|---|---|---|
| | system focal length=2.27mm, half field-of-view=30.57°, system length=2.75mm | | | | | | |
| Object | | ∞ | | | | | |
| aperture stop 2 | | ∞ | -0.149 | | | | |
| first lens element 3 | object-side surface 31 | 0.916 | 0.431 | 1.546 | 56.114 | plastic | 2.175 |
| | image-side surface 32 | 3.350 | 0.160 | | | | |
| second lens element 4 | object-side surface 41 | 2.650 | 0.180 | 1.656 | 21.418 | plastic | 5.156 |
| | image-side surface 42 | -12.023 | 0.100 | | | | |
| third lens element 5 | object-side surface 51 | -1.542 | 0.536 | 1.536 | 55.699 | plastic | 2.023 |
| | image-side surface 52 | -0.714 | 0.100 | | | | |
| fourth lens element 6 | object-side surface 61 | 0.779 | 0.190 | 1.536 | 55.699 | plastic | -2.831 |
| | image-side surface 62 | 0.474 | 0.300 | | | | |
| Optical filter 7 | object-side surface 71 | ∞ | 0.210 | | | | |
| | image-side surface 72 | ∞ | 0.688 | | | | |
| image plane 8 | | ∞ | 0.098 | | | | |

| surface | 31 | 32 | 41 | 42 | 51 | 52 | 61 | 62 |
|---|---|---|---|---|---|---|---|---|
| NRADIUS | 9.165E-01 | 3.350E+00 | -2.650E+00 | -1.262E+01 | -1.542E+00 | -7.140E-01 | 7.787E-01 | 4.736E-01 |
| K | 4.281E-01 | 5.115E-01 | 6.013E-01 | 4.909E-01 | 8.103E-01 | 7.032E-01 | 1.088E+00 | 1.083E+00 |
| a4 | -7.524E+00 | 0.000E+00 | -2.089E+01 | 0.000E+00 | -1.673E+01 | -3.580E-01 | -7.670E+00 | -3.982E+00 |
| a6 | 3.093E-02 | -1.615E-02 | -1.121E-01 | 7.405E-04 | -1.754E-02 | 1.009E-01 | -6.033E-01 | -6.585E-01 |
| a8 | -1.121E-03 | -4.300E-03 | 6.180E-03 | -4.352E-03 | -8.128E-03 | 2.213E-02 | 2.664E-01 | 1.217E-01 |
| a10 | 1.009E-04 | 6.858E-05 | 7.156E-03 | 1.734E-03 | 1.780E-03 | 5.010E-03 | -5.212E-02 | -2.058E-02 |
| a12 | 0.000E+00 | 0.000E+00 | 4.229E-04 | -3.412E-04 | -1.569E-03 | 8.656E-04 | -1.747E-02 | 1.770E-02 |
| a14 | 0.000E+00 | 0.000E+00 | 0.000E+00 | 5.341E-05 | 1.709E-04 | 5.546E-05 | -2.059E-02 | -2.781E-04 |
| a16 | 0.000E+00 | 0.000E+00 | 0.000E+00 | 0.000E+00 | 0.000E+00 | 0.000E+00 | -2.267E-03 | 2.238E-03 |

FIG. 20

FIG. 23 system focal length=2.03mm, half field of view=39.42, system length=2.50mm

| lens element | surface | radius of curvature | thickness | refractive index | Abbe number | material | focal length |
|---|---|---|---|---|---|---|---|
| object | | ∞ | | | | | |
| aperture stop 2 | | ∞ | -0.118 | | | | |
| first lens element 3 | object-side surface 31 | 0.898 | 0.363 | 1.546 | 56.111 | plastic | 1.938 |
| | image-side surface 32 | 5.111 | 0.193 | | | | |
| second lens element 4 | object-side surface 41 | -2.185 | 0.180 | 1.655 | 21.448 | plastic | -4.059 |
| | image-side surface 42 | -12.623 | 0.176 | | | | |
| third lens element 5 | object-side surface 51 | -1.728 | 0.455 | 1.536 | 55.699 | plastic | 2.074 |
| | image-side surface 52 | -0.739 | 0.207 | | | | |
| fourth lens element 6 | object-side surface 61 | 0.623 | 0.181 | 1.536 | 55.699 | plastic | -2.916 |
| | image-side surface 62 | 0.400 | 0.300 | | | | |
| Optical filter 7 | object-side surface 71 | ∞ | 0.210 | | | | |
| | image-side surface 72 | ∞ | 0.367 | | | | |
| image plane 8 | | ∞ | 0.050 | | | | |

| surface | 31 | 32 | 41 | 42 | 51 | 52 | 61 | 62 |
|---|---|---|---|---|---|---|---|---|
| NRADIUS | 8.978E-01 | 5.111E+00 | -2.185E+00 | -1.262E+01 | -1.728E+00 | -7.388E-01 | 6.226E-01 | 4.002E-01 |
| K | 4.239E-01 | 5.184E-01 | 6.065E-01 | 5.251E-01 | 6.870E-01 | 7.032E-01 | 1.134E+00 | 1.140E+00 |
| a₄ | -7.473E+00 | 0.000E+00 | -2.039E+01 | 0.000E+00 | -1.676E-01 | -3.578E-01 | -7.676E+00 | -3.551E+00 |
| a₆ | 3.187E-02 | -1.418E-02 | -1.096E-01 | -1.486E-03 | -2.213E-02 | 1.007E-02 | -6.397E-01 | -5.974E-01 |
| a₈ | -1.256E-03 | -4.297E-03 | 7.030E-03 | -3.103E-03 | -2.966E-03 | 2.222E-03 | 2.093E-01 | 1.029E-01 |
| a₁₀ | 1.069E-04 | -1.960E-04 | 8.936E-03 | 1.380E-03 | 4.615E-06 | 3.627E-03 | 3.817E-02 | -1.200E-02 |
| a₁₂ | 0.000E+00 | 0.000E+00 | 1.580E-03 | 4.709E-05 | -1.185E-03 | 1.104E-03 | -2.033E-02 | 1.672E-02 |
| a₁₄ | 0.000E+00 | 0.000E+00 | 0.000E+00 | 3.777E-05 | -3.997E-04 | -3.346E-04 | -1.907E-02 | 3.410E-04 |
| a₁₆ | 0.000E+00 | 0.000E+00 | 0.000E+00 | 0.000E+00 | 0.000E+00 | 0.000E+00 | -3.862E-03 | 1.607E-03 |

| lens element | surface | system focal length=2.06mm, half field-of-view=33.14°, system length=2.55mm | | | | |
|---|---|---|---|---|---|---|
| | | radius of curvature | thickness | refractive index | Abbe number | material | focal length |
| object | | ∞ | | | | | |
| aperture stop 2 | | ∞ | -0.122 | | | | |
| first lens element 3 | object-side surface 31 | 0.899 | 0.304 | 1.546 | 56.114 | plastic | 1.849 |
| | image-side surface 32 | 6.600 | 0.129 | | | | |
| second lens element 4 | object-side surface 41 | -2.132 | 0.189 | 1.655 | 21.448 | plastic | -3.942 |
| | image-side surface 42 | -12.623 | 0.100 | | | | |
| third lens element 5 | object-side surface 51 | -1.935 | 0.502 | 1.536 | 55.699 | plastic | 2.052 |
| | image-side surface 52 | -0.765 | 0.221 | | | | |
| fourth lens element 6 | object-side surface 61 | 0.716 | 0.182 | 1.536 | 55.699 | plastic | -2.457 |
| | image-side surface 62 | 0.423 | 0.300 | | | | |
| Optical filter 7 | object-side surface 71 | ∞ | 0.210 | | | | |
| | image-side surface 72 | ∞ | 0.272 | | | | |
| Image plane 8 | | ∞ | 0.038 | | | | |

FIG. 28

| surface | 31 | 32 | 41 | 42 | 51 | 52 | 61 | 62 |
|---|---|---|---|---|---|---|---|---|
| NRADIUS | 8.990E-01 | 6.600E+00 | -2.132E+00 | -1.262E-01 | -1.935E+00 | -7.650E-01 | 7.156E-01 | 4.226E-01 |
| K | 4.256E-01 | 5.105E-01 | 6.007E-01 | 5.231E-01 | 6.382E-01 | 7.092E-01 | 1.121E+00 | 1.147E+00 |
| $a_2$ | -7.473E+00 | 0.000E+00 | -2.089E+01 | 0.000E+00 | -1.675E+01 | -3.117E-01 | -7.676E+00 | -3.380E+00 |
| $a_3$ | 3.154E-02 | -1.638E-02 | -1.113E-01 | 1.537E-03 | -2.765E-02 | 9.301E-02 | -6.778E-01 | -7.111E-01 |
| $a_4$ | -1.204E-03 | -4.220E-03 | 5.000E-03 | -3.886E-03 | -5.496E-03 | 1.812E-02 | 2.084E-01 | 1.073E-01 |
| $a_5$ | 1.329E-04 | 4.765E-04 | 8.505E-03 | 1.742E-03 | 2.174E-03 | 4.619E-03 | -4.969E-02 | -1.978E-02 |
| $a_6$ | 0.000E+00 | 0.000E+00 | 5.785E-04 | -1.371E-04 | -3.372E-04 | 9.841E-04 | -1.728E-02 | 1.603E-02 |
| $a_7$ | 0.000E+00 | 0.000E+00 | 0.000E+00 | 3.904E-05 | -4.843E-05 | -9.111E-05 | -1.688E-02 | -4.313E-04 |
| $a_8$ | 0.000E+00 | 0.000E+00 | 0.000E+00 | 0.000E+00 | 0.000E+00 | 0.000E+00 | -3.805E-03 | 1.476E-03 |

FIG. 31 system focal length=1.97mm, half field-of-view=34.38°, system length=2.46mm

| lens element | surface | radius of curvature | thickness | refractive index | Abbe number | material | focal length |
|---|---|---|---|---|---|---|---|
| object | | ∞ | | | | | |
| aperture stop 2 | | ∞ | 0.110 | | | | |
| first lens element 3 | object-side surface 31 | 0.896 | 0.429 | 1.546 | 56.114 | plastic | 1.937 |
| | image-side surface 32 | 4.877 | 0.174 | | | | |
| second lens element 4 | object-side surface 41 | -2.258 | 0.395 | 1.655 | 21.448 | plastic | -4.245 |
| | image-side surface 42 | -12.623 | 0.100 | | | | |
| third lens element 5 | object-side surface 51 | -1.721 | 0.359 | 1.536 | 55.699 | plastic | 2.047 |
| | image-side surface 52 | -0.719 | 0.228 | | | | |
| fourth lens element 6 | object-side surface 61 | 0.711 | 0.292 | 1.536 | 55.699 | plastic | -2.580 |
| | image-side surface 62 | 0.423 | 0.390 | | | | |
| Optical filter 7 | object-side surface 71 | ∞ | 0.210 | | | | |
| | image-side surface 72 | ∞ | 0.267 | | | | |
| image plane 8 | | ∞ | 0.032 | | | | |

| surface | 31 | 32 | 41 | 42 | 51 | 52 | 61 | 62 |
|---|---|---|---|---|---|---|---|---|
| NRADIUS | 8.959E-01 | 4.877E+00 | -2.258E+01 | -1.262E+01 | -1.721E+00 | -7.191E-01 | 7.105E-01 | 4.229E-01 |
| K | 4.271E-01 | 4.991E-01 | 5.055E-01 | 5.400E-01 | 6.921E-01 | 7.003E-01 | 1.111E+00 | 1.145E+00 |
| a₂ | -7.473E+00 | 0.000E+00 | -2.089E+00 | 0.000E+00 | -1.675E-01 | -3.364E-01 | -7.676E+00 | -3.375E+00 |
| a₃ | 3.108E-02 | -1.823E-02 | -1.150E-01 | 4.149E-03 | -8.114E-03 | 9.704E-02 | -6.618E-01 | -6.890E-01 |
| a₄ | -1.372E-03 | -2.742E-03 | 8.799E-03 | -3.862E-03 | -8.930E-03 | 2.314E-02 | 2.332E-01 | 1.083E-01 |
| a₅ | 1.239E-04 | 1.234E-04 | 6.512E-04 | 1.549E-03 | 2.243E-03 | 5.782E-03 | -3.980E-02 | -2.394E-02 |
| a₆ | 0.000E+00 | 0.000E+00 | 9.272E-04 | -2.865E-04 | -2.456E-03 | 9.605E-05 | -1.882E-02 | 1.578E-02 |
| a₇ | 0.000E+00 | 0.000E+00 | 0.000E+00 | 7.691E-05 | 3.191E-04 | -4.646E-04 | -2.200E-02 | -6.404E-04 |
| a₈ | 0.000E+00 | 0.000E+00 | 0.000E+00 | 0.000E+00 | 0.000E+00 | 0.000E+00 | -7.034E-03 | 1.304E-03 |

FIG. 32

| relationship | first preferred embodiment | second preferred embodiment | third preferred embodiment | fourth preferred embodiment | fifth preferred embodiment | sixth preferred embodiment | seventh preferred embodiment | eighth preferred embodiment |
|---|---|---|---|---|---|---|---|---|
| BFL | 0.97 | 1.13 | 0.76 | 0.95 | 1.30 | 0.93 | 0.82 | 0.81 |
| $G_{56}$ | 0.32 | 0.32 | 0.46 | 0.43 | 0.36 | 0.58 | 0.51 | 0.50 |
| $T_3$ | 0.25 | 0.28 | 0.38 | 0.18 | 0.18 | 0.18 | 0.19 | 0.30 |
| EFL | 2.01 | 2.10 | 1.94 | 2.03 | 2.27 | 2.03 | 2.06 | 1.97 |
| $T_1$ | 0.49 | 0.44 | 0.42 | 0.40 | 0.43 | 0.35 | 0.50 | 0.43 |
| $G_{12}$ | 0.12 | 0.12 | 0.17 | 0.17 | 0.16 | 0.19 | 0.13 | 0.17 |
| $G_{56}/T_2$ | 1.31 | 1.15 | 1.20 | 2.40 | 2.00 | 3.20 | 2.70 | 1.66 |
| $BFL/G_{56}$ | 3.00 | 3.50 | 1.65 | 2.20 | 3.60 | 1.61 | 1.61 | 1.61 |
| $EFL/T_2$ | 8.15 | 7.47 | 5.05 | 11.27 | 12.63 | 11.26 | 10.91 | 6.50 |
| $T_1/G_{12}$ | 4.03 | 3.51 | 2.49 | 2.32 | 2.69 | 1.83 | 3.92 | 2.46 |

FIG. 34

IMAGING LENS HAVING FOUR LENS ELEMENTS, AND ELECTRONIC APPARATUS HAVING THE SAME

CROSS-REFERENCES TO RELATED APPLICATIONS

This application is a continuation of U.S. patent application Ser. No. 13/738,313, filed on Jan. 10, 2013, which claims priority to Taiwanese Application No. 101130990, filed on Aug. 27, 2012, the contents of which are hereby incorporated by reference in their entirety for all purposes.

BACKGROUND OF THE INVENTION

Field of the Invention

The present invention relates to an imaging lens and an electronic apparatus, more particularly to an imaging lens having four lens elements and an electronic apparatus having the same.

Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

In view of the above, each of U.S. Pat. No. 7,355,801 and US Patent Application Publication No. 20120013998 discloses a conventional imaging lens with four lens elements, of which the image-side surface of a second lens element is a concave surface.

Japanese Patent Application Publication No. 2011-064989, U.S. Pat. Nos. 7,920,340 and 7,777,972, and U.S. Patent Application Publication No. 20110058089 also disclose conventional imaging lenses with four lens elements, each of which is spaced apart from an adjacent one of the lens elements by a relatively wide gap. In the fifth embodiment of U.S. Pat. No. 7,920,340, the lens has a length of 7 mm, which goes against the trend toward reducing thickness of portable electronic products, such as mobile phones and digital cameras.

Thus, it is apparent that the current trend in development of imaging systems for portable electronic devices focuses on reducing overall lengths of the imaging systems. However, optical performances and imaging qualities of the imaging systems may be compromised as the overall lengths are reduced.

BRIEF SUMMARY OF THE INVENTION

Therefore, an object of the present invention is to provide an imaging lens having a shorter overall length while maintaining good optical performance.

Accordingly, an imaging lens of the present invention comprises first, second, third, and fourth lens elements arranged from an object side to an image side in the given order. Each of the first, second, third, and fourth lens elements has an object-side surface facing toward the object side and an image-side surface facing toward the image side.

The first lens element has a positive refractive power, and the object-side surface thereof is a convex surface.

The second lens element has a negative refractive power, and the image-side surface thereof has a convex portion in a vicinity of an optical axis of the imaging lens.

The object-side surface of the third lens element has a concave portion in a vicinity of the optical axis of the imaging lens.

The object-side surface of the fourth lens element has a convex portion in a vicinity of the optical axis of the imaging lens.

The image-side surface of the fourth lens element has a concave portion in a vicinity of the optical axis of the imaging lens, and a convex portion in a vicinity of a periphery of the fourth lens element.

The imaging lens does not include any lens element with refractive power other than the first, second, third, and fourth lens elements.

Another object of the present invention is to provide an electronic apparatus having an imaging lens with four lens elements.

Accordingly, an electronic apparatus of the present invention comprises a housing; and an imaging module disposed in the housing, and including the imaging lens of the present invention, a barrel on which the imaging lens is disposed, a seat unit on which the barrel is disposed, and an image sensor disposed at the image side and operatively associated with the imaging lens for capturing images.

BRIEF DESCRIPTION OF THE DRAWINGS

Other features and advantages of the present invention will become apparent in the following detailed description of the preferred embodiments with reference to the accompanying drawings, of which:

FIG. 2 shows values of some optical parameters corresponding to the imaging lens of the first preferred embodiment;

FIG. 3 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 31 shows values of some optical parameters corresponding to the imaging lens of the eighth preferred embodiment;

FIG. 32 shows values of some parameters of an optical relationship corresponding to the imaging lens of the eighth preferred embodiment;

FIG. 34 is a table that shows values of parameters of other optical relationships corresponding to the imaging lenses of the first to eighth preferred embodiments;

DETAILED DESCRIPTION OF THE INVENTION

Figure 1:
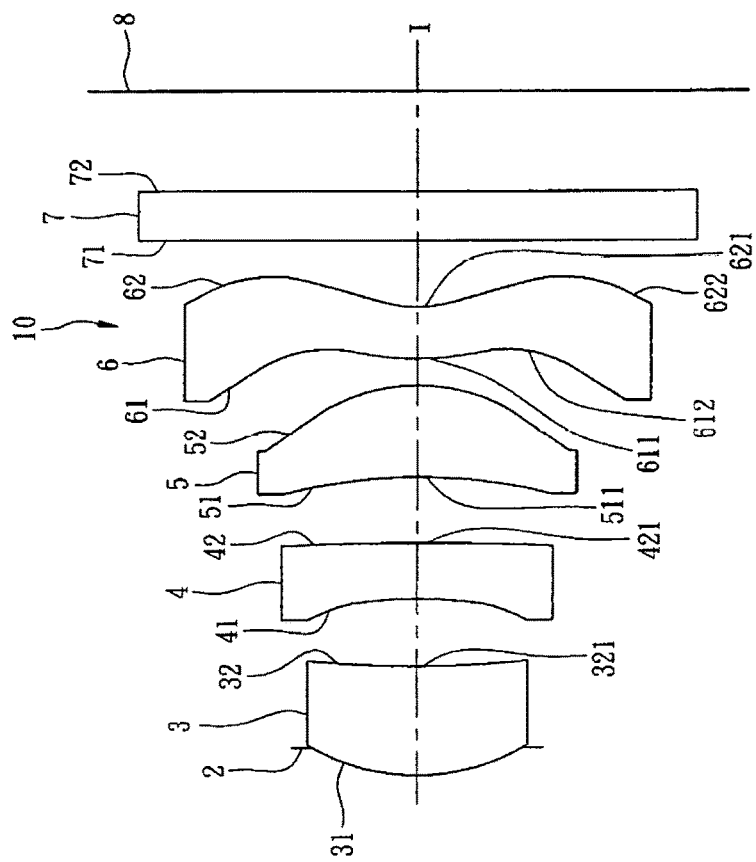
FIG. 1 is a schematic diagram that illustrates the first preferred embodiment of an imaging lens according to the present invention.

Before the present invention is described in greater detail, it should be noted that like elements are denoted by the same reference numerals throughout the disclosure.

Referring to FIG. 1, an imaging lens 10 of the present invention includes an aperture stop 2, first, second, third, and fourth lens elements 3-6, and an optical filter 7 arranged in the given order along an optical axis (I) from an object side to an image side. The optical filter 7 is an infrared cut filter for selectively absorbing infrared light to thereby reduce imperfection of images formed at an image plane 8.

Each of the first, second, third, and fourth lens elements 3-6 and the optical filter 7 has an object-side surface 31, 41, 51, 61, 71 facing toward the object side, and an image-side surface 32, 42, 52, 62, 72 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 8. Each of the object-side surfaces 31, 41, 51, 61 and the image-side surfaces 32, 42, 52, 62 is aspherical and has a center point coinciding with the optical axis (I).

During manufacture, the first lens element 3 may be formed with an extending portion, which may be flat or stepped in shape. In terms of function, while the object-side and image-side surfaces 31, 32 are configured to enable passage of light through the first lens element 3, the extending portion merely serves to provide the function of installation and does not contribute toward passage of light through the first lens element 3. The other lens elements 4-6 may also be formed with extending portions similar to that of the first lens element 3.

The lens elements 3-6 are made of plastic material in this embodiment, and at least one of them may be made of other materials in other embodiments.

In the first preferred embodiment, which is depicted in FIG. 1, the first lens element 3 has a positive refractive power, the object-side surface 31 thereof is a convex surface, and the image-side surface 32 thereof is a concave surface that has a concave portion 321 in a vicinity of the optical axis (I).

The second lens element 4 has a negative refractive power, the object-side surface 41 thereof is a concave surface, and the image-side surface 42 thereof is a convex surface that has a convex portion 421 in a vicinity of the optical axis (I).

The third lens element 5 has a positive refractive power, the object-side surface 51 thereof is a concave surface that has a concave portion 511 in a vicinity of the optical axis (I), and the image-side surface 52 thereof is a convex surface.

The fourth lens element 6 has a negative refractive power, the object-side surface 61 thereof is a curved surface that has a convex portion 611 in a vicinity of the optical axis (I) and a concave portion 612 in a vicinity of the periphery of the fourth lens element 6, and the image-side surface 62 thereof is a curved surface that has a concave portion 621 in a vicinity of the optical axis (I) and a convex portion 622 in a vicinity of the periphery of the fourth lens element 6.

Shown in FIG. 2 is a table that lists values of some optical parameters corresponding to the surfaces 31-61, 32-62 of the first preferred embodiment. The imaging lens 10 has an overall system focal length of 2.01 mm, a half field-of-view (HFOV) of 33.54°, and a system length of 2.50 mm.

Figure 5:
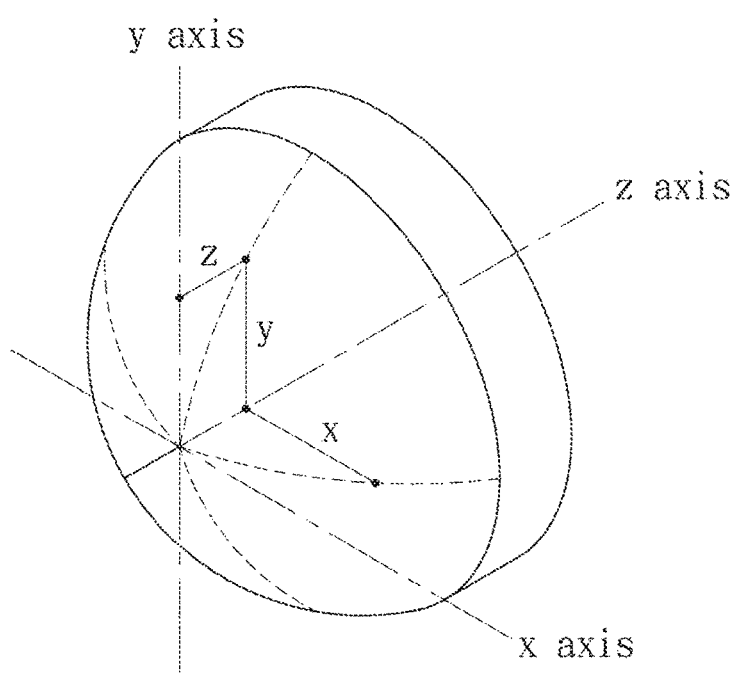
FIG. 5 is a schematic diagram illustrating spatial axes.

In this embodiment, each of the object-side surfaces 31-61 and the image-side surfaces 32-62 is aspherical, and satisfies the optical relationship of $$z = \frac{cr^2}{1+\sqrt{1-(1+K)c^2r^2}} + u^4 \sum_{m=0}^{13} a_m Q_m^{con}(u^2) \quad (1)$$

where:

z represents a depth of an aspherical surface, which is defined as a perpendicular distance between an arbitrary point on the aspherical surface and a tangential plane at a vertex of the aspherical surface at the optical axis (I), and the distance between the arbitrary point and the optical axis (I) is represented as y;

c represents a vertex curvature of the aspherical surface;
K represents a conic constant;
r represents a radial distance, and satisfies a relationship of $r=\sqrt{x^2+y^2}$;
u represents $r/r_n$, where $r_n$ represents a normalization radius (NRADIUS);
$a_m$ represents an $m^{th}$ $Q^{con}$ coefficient; and
$Q_m^{con}$ represents an $m^{th}$ $Q^{con}$ polynomial,
where x, y, and z have a relationship thereamong, as shown in FIG. 5, and the z axis is the optical axis (I).

Shown in FIG. 3 is a table that lists values of some optical parameters of the aforementioned optical relationship (1) corresponding to the first preferred embodiment.

Relationships among some of the aforementioned optical parameters corresponding to the first preferred embodiment are as follows:

$G_{aa}/T_2=1.31$ $BFL/G_{aa}=3.00$ $EFL/T_2=8.15$ $T_1/G_{12}=4.03$ where:

$T_1$ represents a distance between the object-side surface 31 and the image-side surface 32 of the first lens element 3 at the optical axis (I);

$T_2$ represents a distance between the object-side surface 41 and the image-side surface 42 of the second lens element 4 at the optical axis (I);

$G_{aa}$ represents a sum of a distance between the image-side surface 32 of the first lens element 3 and the object-side surface 41 of the second lens element 4 at the optical axis (I), a distance between the image-side surface 42 of the second lens element 4 and the object-side surface 51 of the third lens element 5 at the optical axis (I), and a distance between the image-side surface 52 of the third lens element 5 and the object-side surface 61 of the fourth lens element 6 at the optical axis (I);

$G_{12}$ represents a distance between the image-side surface 32 of the first lens element 3 and the object-side surface 41 of the second lens element 4 at the optical axis (I);

BFL represents a distance between the image-side surface 62 of the fourth lens element 6 and the image plane 8 of the imaging lens 10 at the optical axis (I); and EFL (effective focal length) represents a system focal length of the imaging lens 10.

FIGS. 4(a) to 4(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

Figure 4:
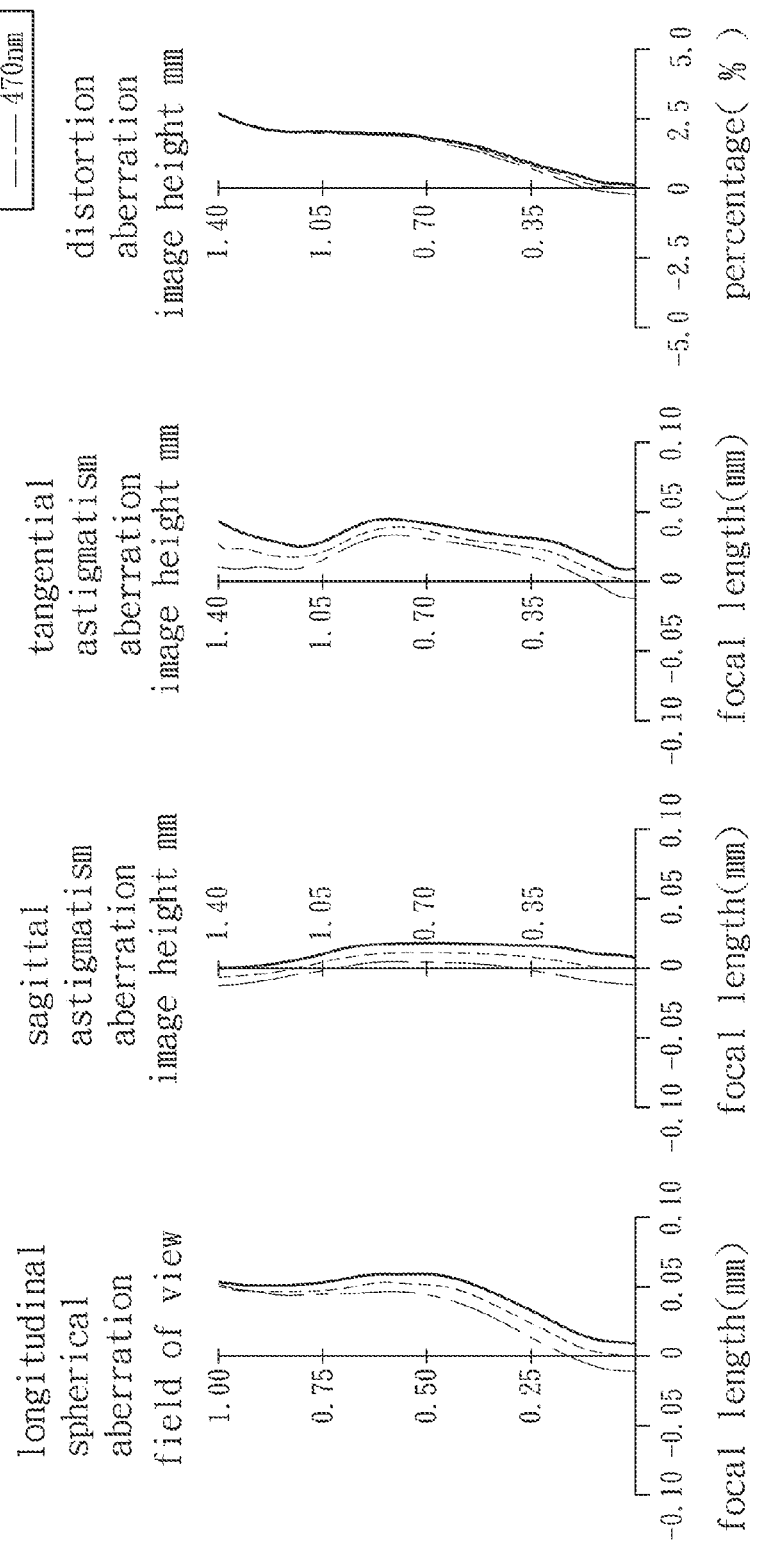
FIGS. 4(a) to 4(d) show different optical characteristics of the imaging lens of the first preferred embodiment.

It can be understood from FIG. 4(a) that, since each of the curves corresponding to longitudinal spherical aberration has a focal length at each field of view (indicated by the vertical axis) that falls within the range of ±0.075 mm, the first preferred embodiment is able to achieve a relatively low spherical aberration at each of the wavelengths. Furthermore, since a deviation in focal length among the curves at each field of view does not exceed the range of ±0.015 mm, the first preferred embodiment has a relatively low chromatic aberration.

It can be understood from FIGS. 4(b) and 4(c) that, since each of the curves falls within the range of ±0.05 mm of focal length, and each of the curves corresponding to sagittal astigmatism aberration falls within the range of ±0.02 mm of focal length, the first preferred embodiment has a relatively low optical aberration.

Moreover, as shown in FIG. 4(d), since each of the curves corresponding to distortion aberration falls within the range of ±3%, the first preferred embodiment is able to meet requirements in imaging quality of most optical systems.

In view of the above, with the system length reduced down to below 3 mm, the imaging lens 3 of the first preferred embodiment is still able to achieve a relatively good optical performance.

Figure 6:
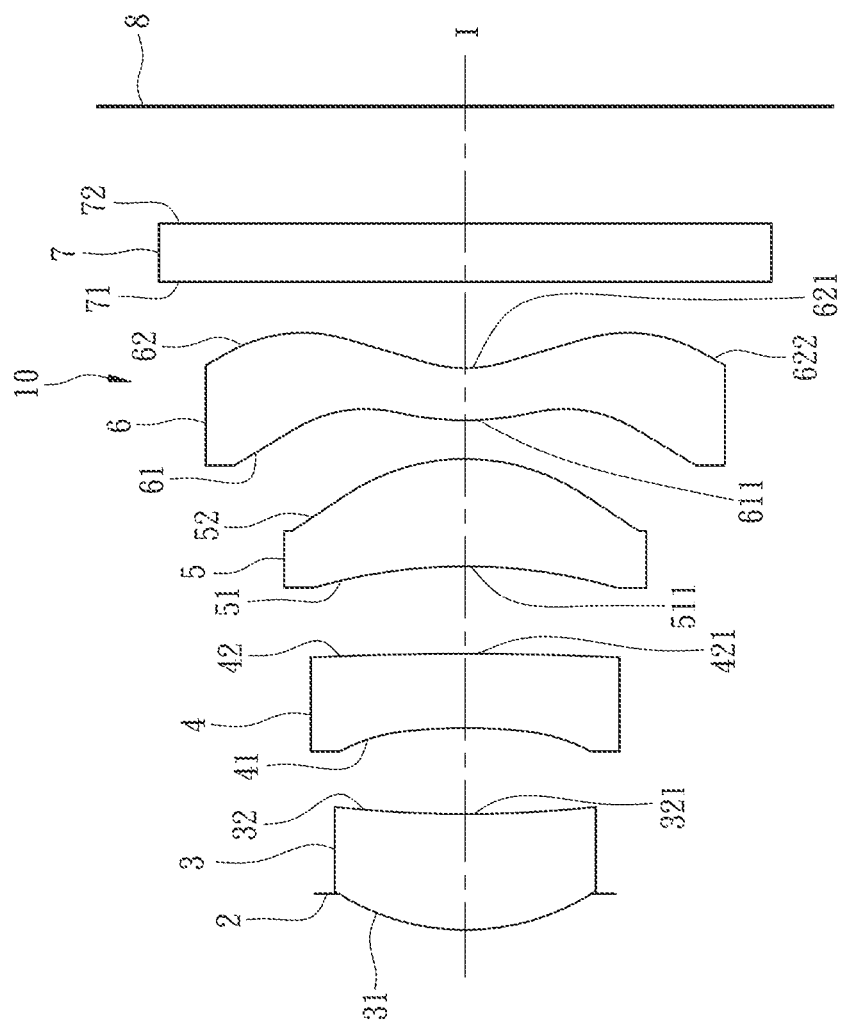
FIG. 6 is a schematic diagram that illustrates the second preferred embodiment of an imaging lens according to the present invention.
Figure 9:
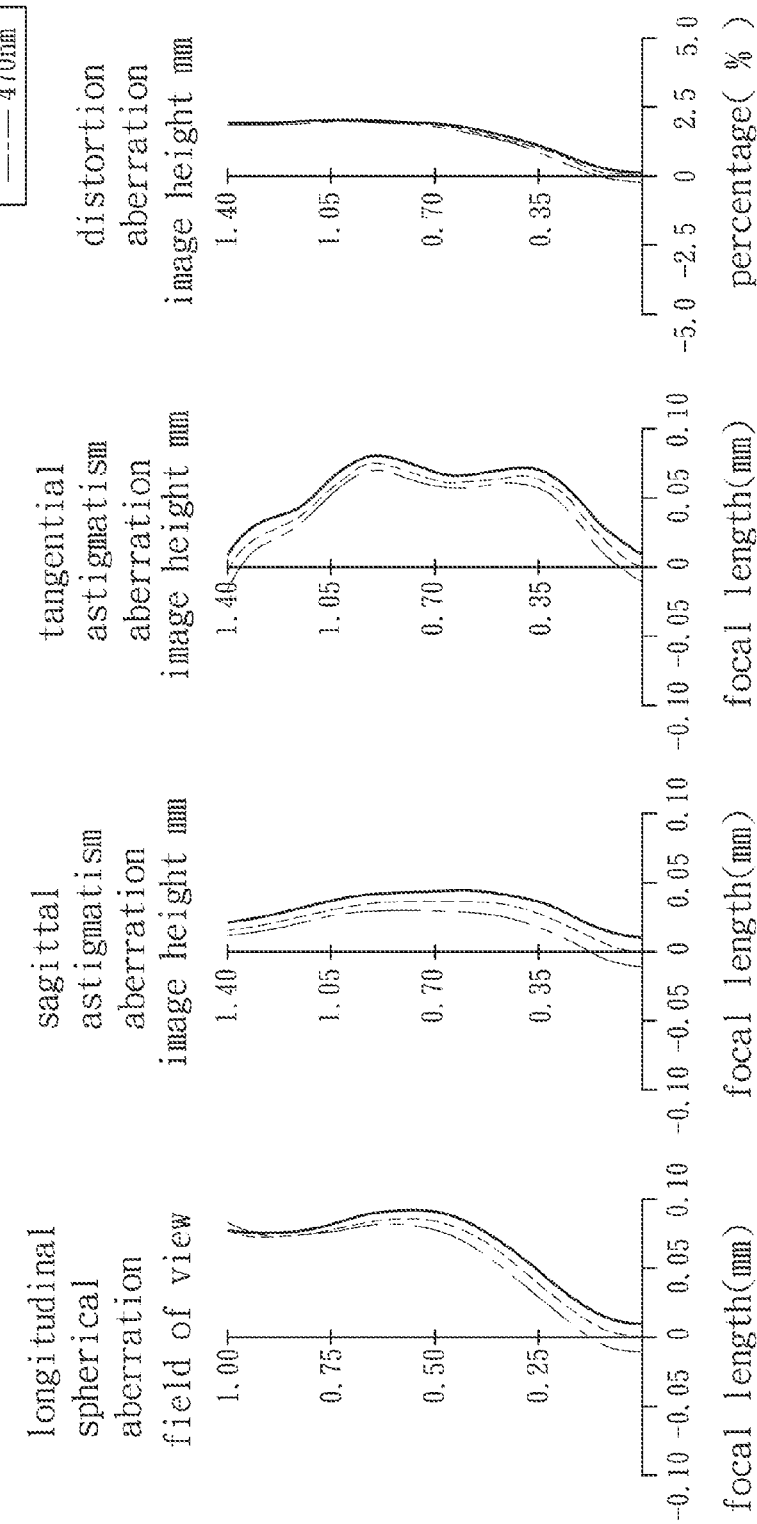
FIGS. 9(a) to 9(d) show different optical characteristics of the imaging lens of the second preferred embodiment.

FIG. 6 illustrates the second preferred embodiment of an imaging lens 10 of the present invention, which has a configuration similar to the first preferred embodiment.

Shown in FIG. 7 is a table that lists values of some optical parameters corresponding to the surfaces 31-61, 32-62 of the second preferred embodiment. The imaging lens 10 has an overall system focal length of 2.10 mm, an HFOV of 32.24°, and a system length of 2.57 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

$G_{aa}/T_2=1.15$ $BFL/G_{aa}=3.50$ $EFL/T_2=7.47$ $T_1/G_{12}=3.51$

FIGS. 9(a) to 9(d) show simulation results corresponding to longitudinal spherical aberration, sagittal astigmatism aberration, tangential astigmatism aberration, and distortion aberration of the second preferred embodiment, respectively. It can be understood from FIGS. 9(a), 9(b), 9(c) and 9(d) that the second preferred embodiment is likewise able to achieve a relatively good optical performance even with the system length reduced down to below 3 mm.

Figure 10:
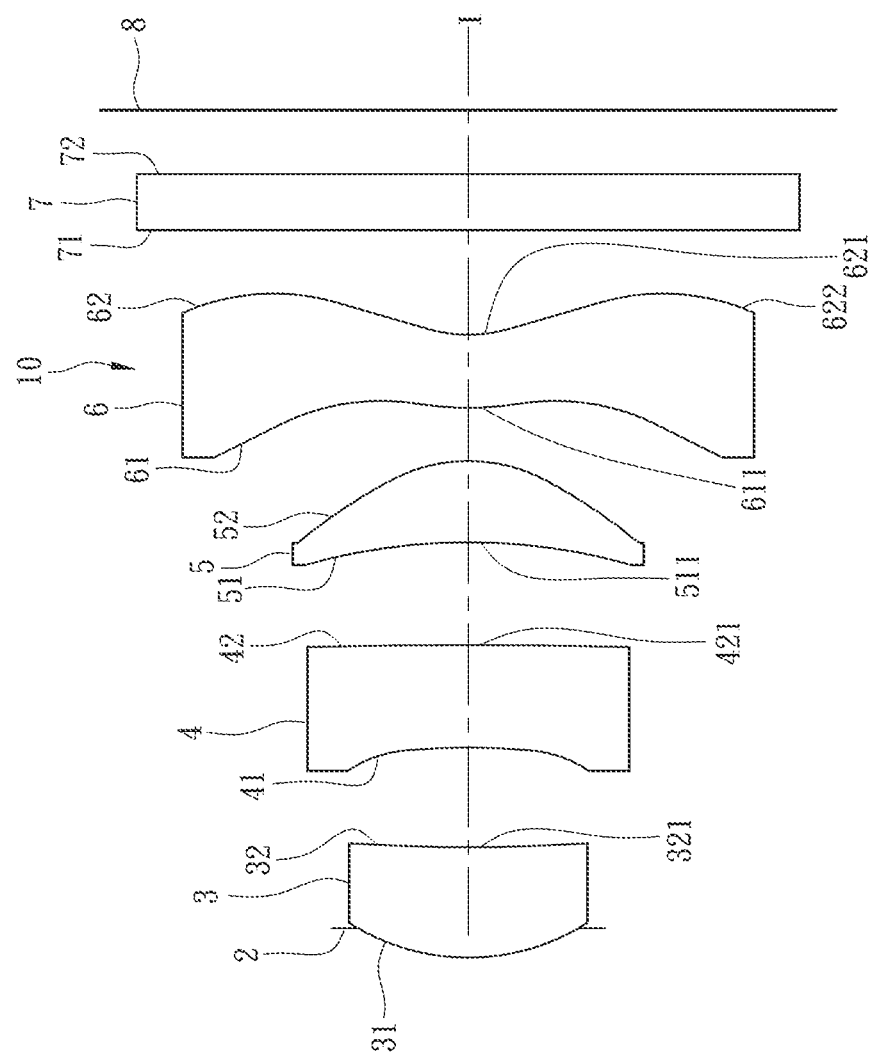
FIG. 10 is a schematic diagram that illustrates the third preferred embodiment of an imaging lens according to the present invention.
Figure 13:
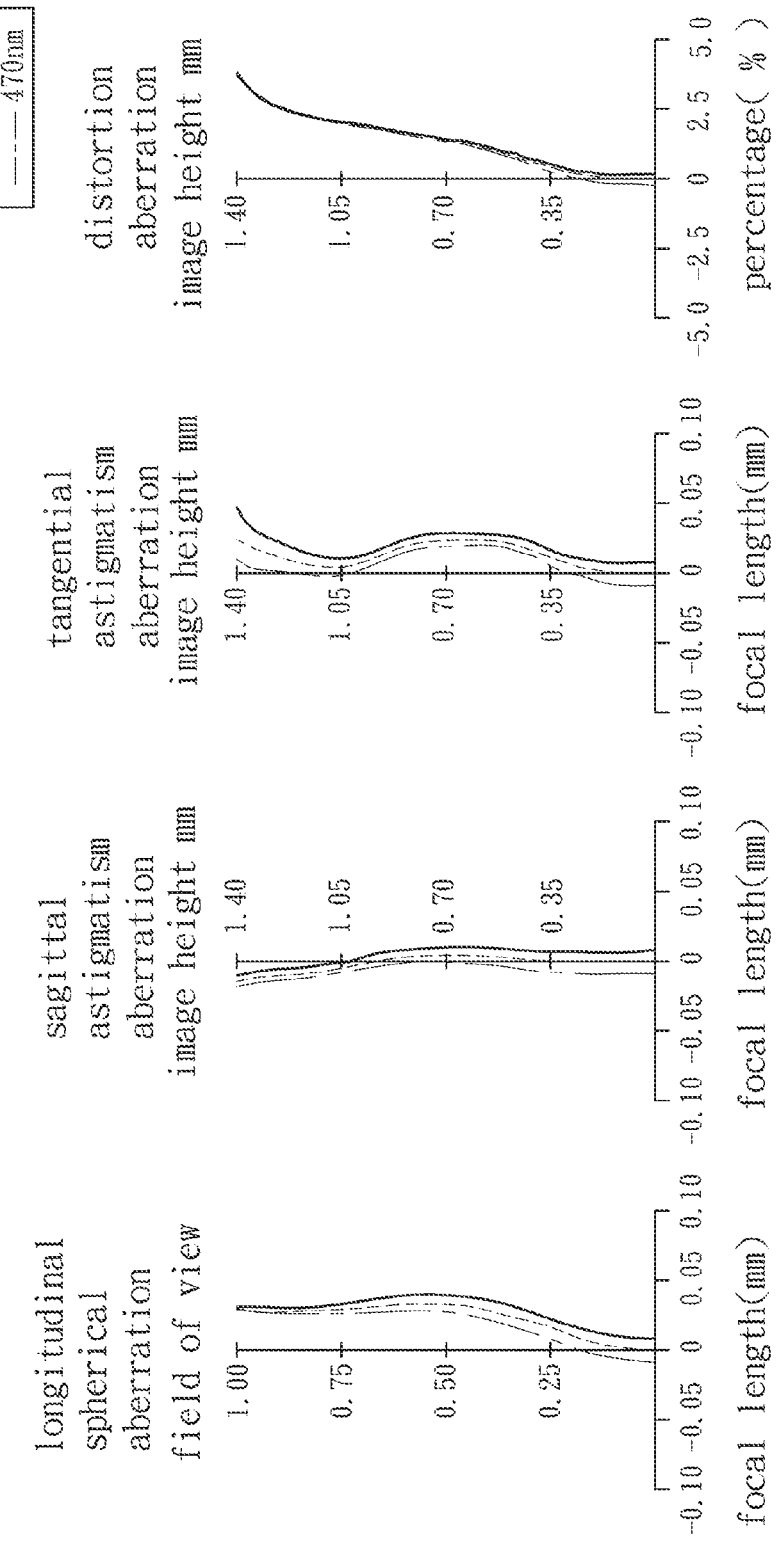
FIGS. 13(a) to 13(d) show different optical characteristics of the imaging lens of the third preferred embodiment.

FIG. 10 illustrates the third preferred embodiment of an imaging lens 10 of the present invention, which has a configuration similar to the first preferred embodiment.

Shown in FIG. 11 is a table that lists values of some optical parameters corresponding to the surfaces 31-61, 32-62 of the third preferred embodiment. The imaging lens 10 has an overall system focal length of 1.94 mm, an HFOV of 34.48°, and a system length of 2.46 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

$G_{aa}/T_2=1.20$ $BFL/G_{aa}=1.65$ $EFL/T_2=5.05$ $T_1/G_{12}=2.49$

FIGS. 13(a) to 13(d) show simulation results corresponding to longitudinal spherical aberration, sagittal astigmatism aberration, tangential astigmatism aberration, and distortion aberration of the third preferred embodiment, respectively. It can be understood from FIGS. 13(a), 13(b), 13(c) and 13(d) that the third preferred embodiment is likewise able to achieve a relatively good optical performance even with the system length reduced down to below 3 mm.

Figure 14:
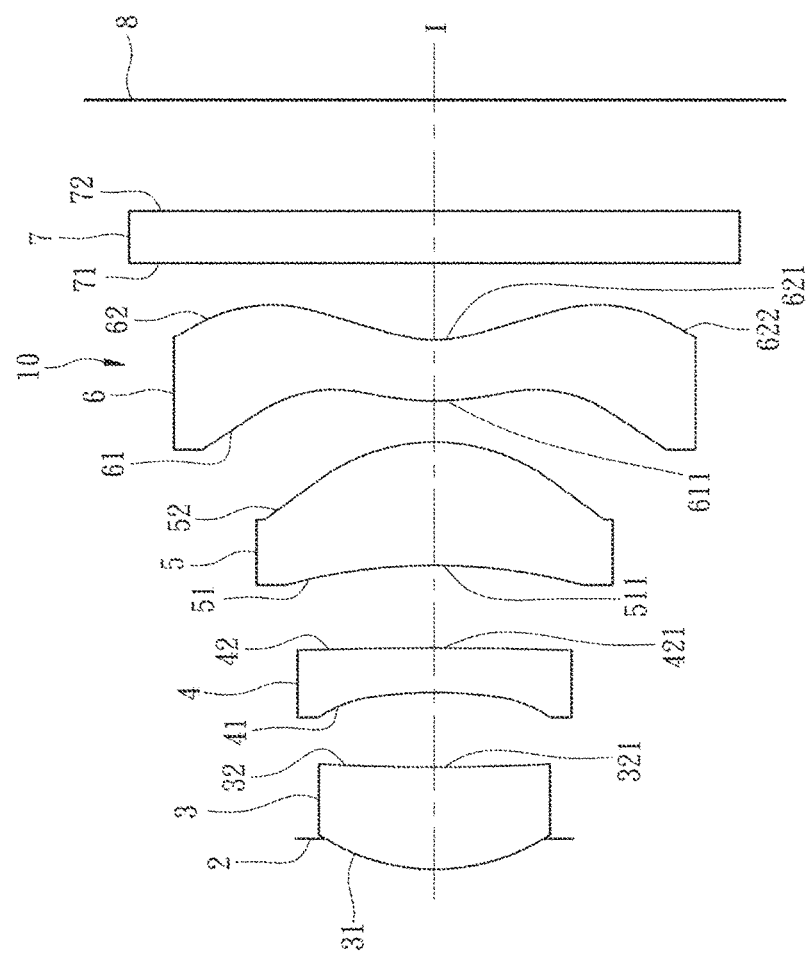
FIG. 14 is a schematic diagram that illustrates the fourth preferred embodiment of an imaging lens according to the present invention.
Figure 17:
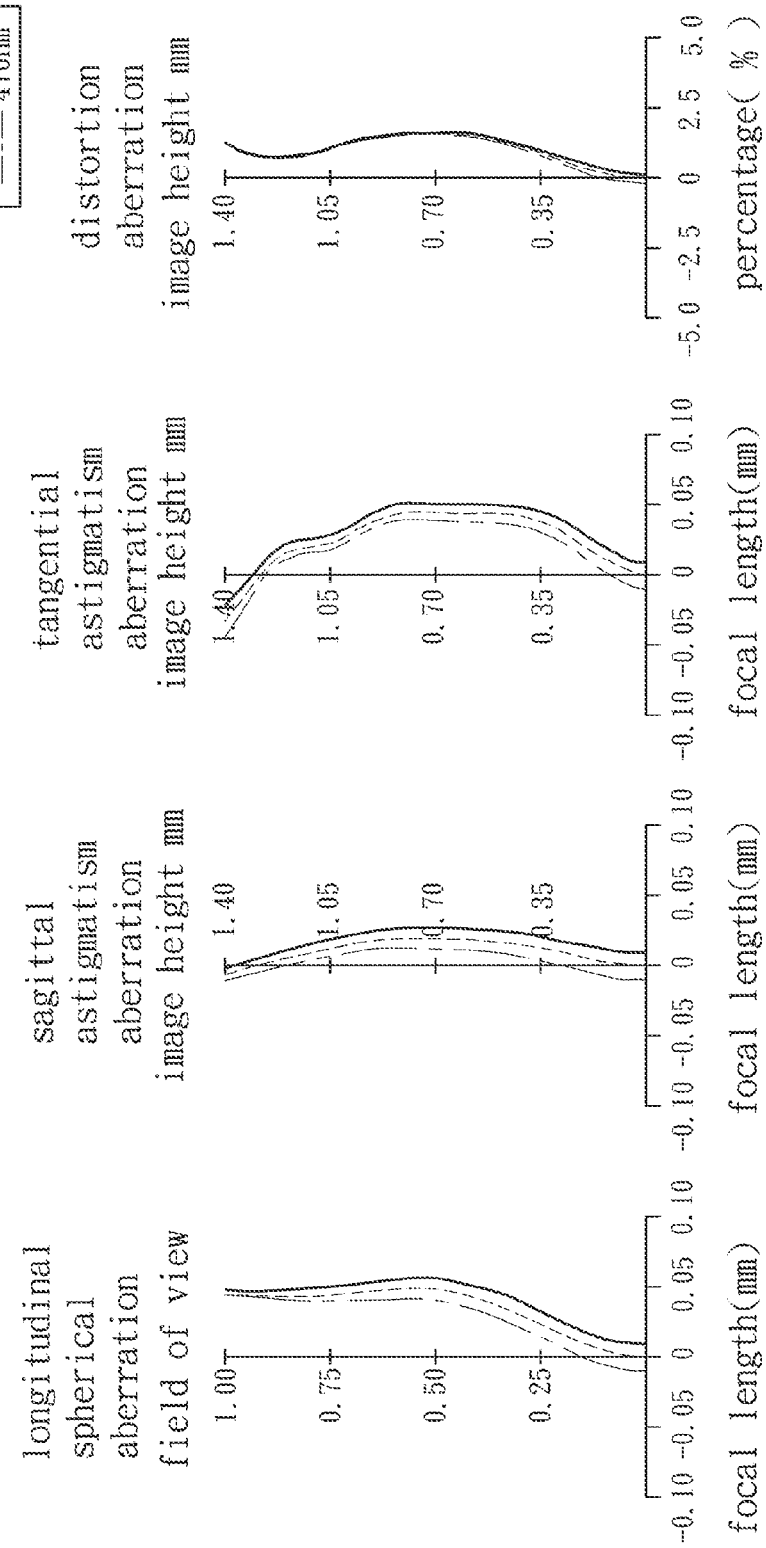
FIGS. 17(a) to 17(d) show different optical characteristics of the imaging lens of the fourth preferred embodiment.

FIG. 14 illustrates the fourth preferred embodiment of an imaging lens 10 of the present invention, which has a configuration similar to the first preferred embodiment.

Shown in FIG. 15 is a table that lists values of some optical parameters corresponding to the surfaces 31-61, 32-62 of the fourth preferred embodiment. The imaging lens 10 has an overall system focal length of 2.03 mm, an HFOV of 33.85°, and a system length of 2.56 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

$G_{aa}/T_2=2.40$ $BFL/G_{aa}=2.20$ $EFL/T_2=11.27$ $T_1/G_{12}=2.32$

FIGS. 17(a) to 17(d) show simulation results corresponding to longitudinal spherical aberration, sagittal astigmatism aberration, tangential astigmatism aberration, and distortion aberration of the fourth preferred embodiment, respectively. It can be understood from FIGS. 17(a), 17(b), 17(c) and 17(d) that the fourth preferred embodiment is likewise able to achieve a relatively good optical performance even with the system length reduced down to below 3 mm.

Figure 18:
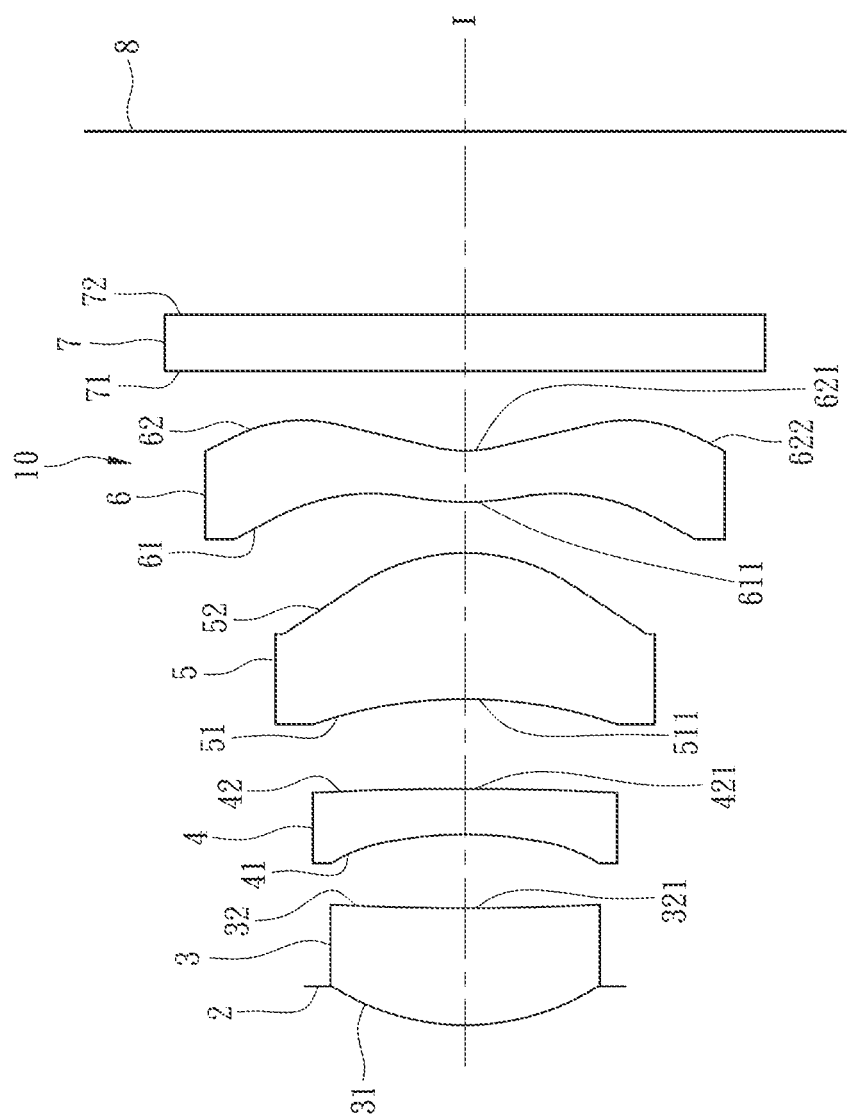
FIG. 18 is a schematic diagram that illustrates the fifth preferred embodiment of an imaging lens according to the present invention.
Figure 21:
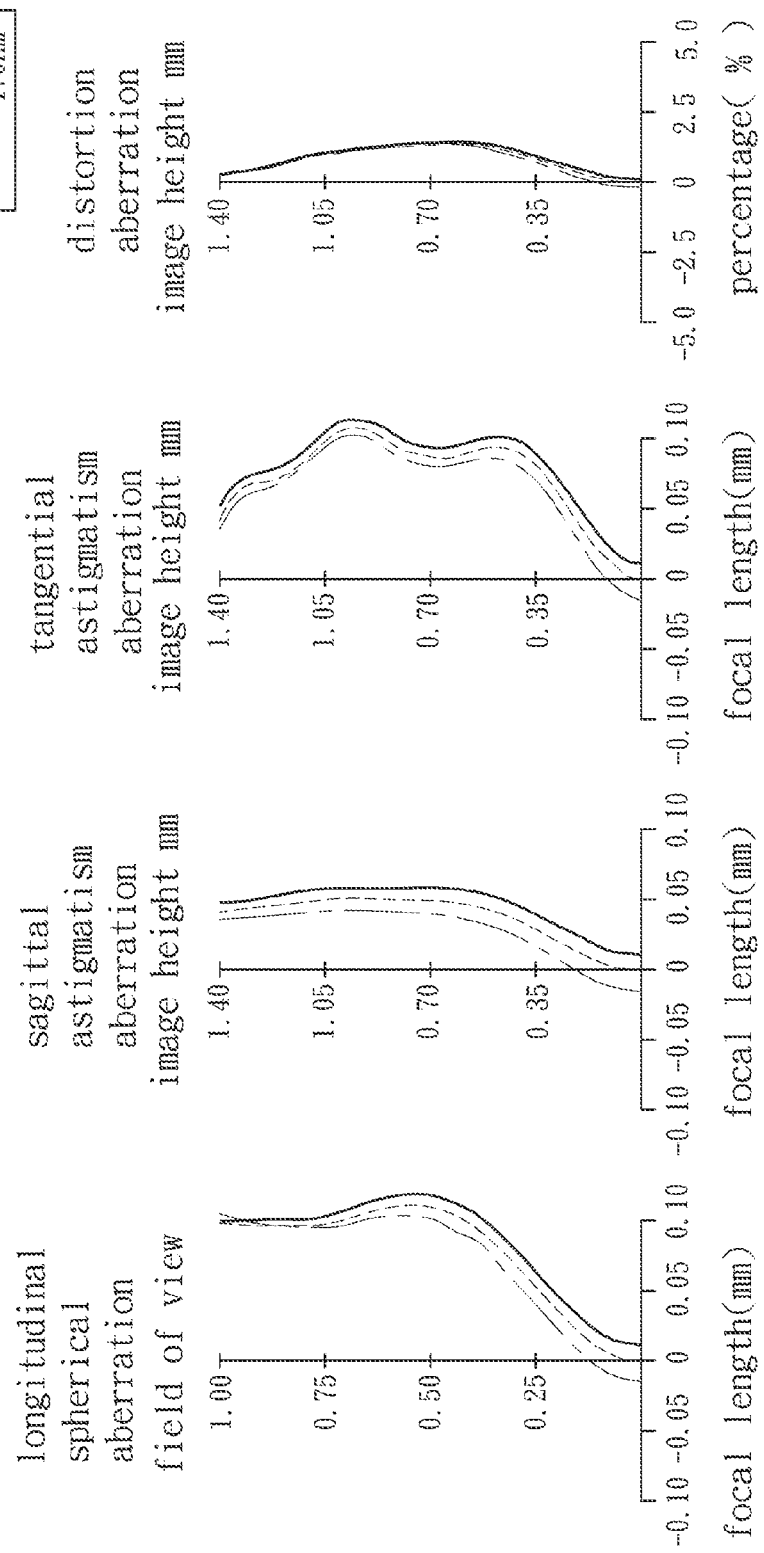
FIGS. 21(a) to 21(d) show different optical characteristics of the imaging lens of the fifth preferred embodiment.

FIG. 18 illustrates the fifth preferred embodiment of an imaging lens 10 of the present invention, which has a configuration similar to the first preferred embodiment.

Shown in FIG. 19 is a table that lists values of some optical parameters corresponding to the surfaces 31-61, 32-62 of the fifth preferred embodiment. The imaging lens 10 has an overall system focal length of 2.27 mm, an HFOV of 30.57°, and a system length of 2.75 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

$G_{aa}/T_2=2.00$ $BFL/G_{aa}=3.60$ $EFL/T_2=12.63$ $T_1/G_{12}=2.69$

FIGS. 21(a) to 21(d) show simulation results corresponding to longitudinal spherical aberration, sagittal astigmatism aberration, tangential astigmatism aberration, and distortion aberration of the fifth preferred embodiment, respectively. It can be understood from FIGS. 21(a), 21(b), 21(c) and 21(d) that the fifth preferred embodiment is likewise able to achieve a relatively good optical performance even with the system length reduced down to below 3 mm.

Figure 22:
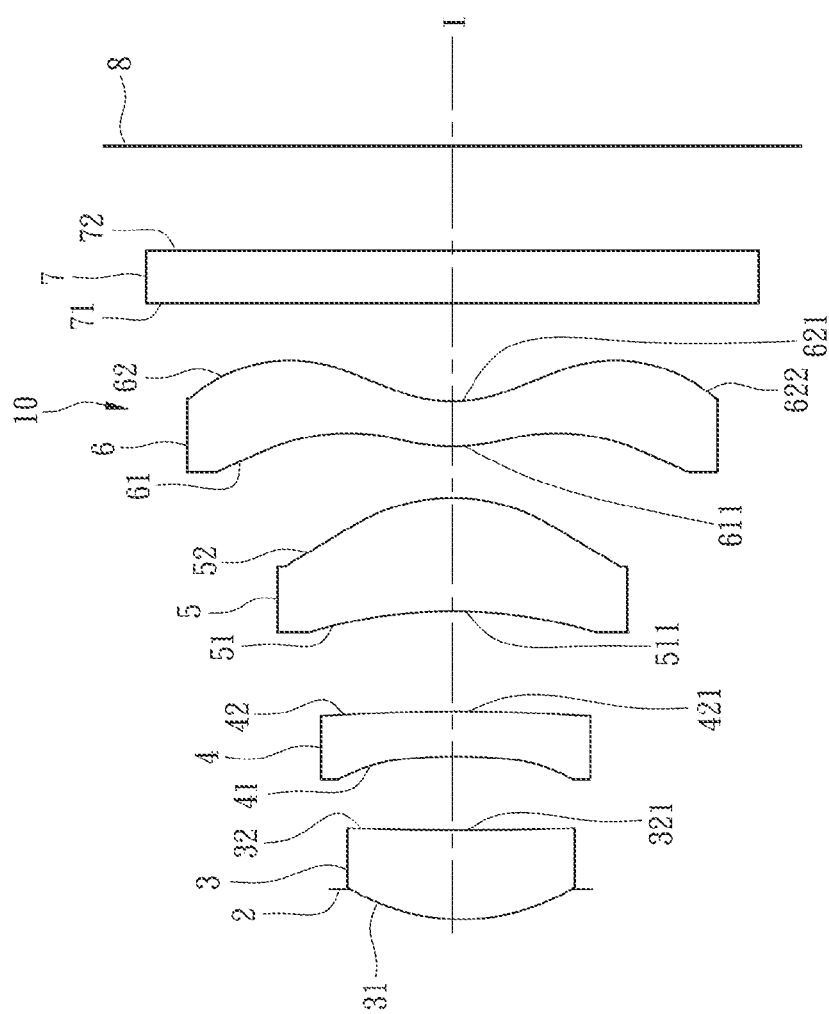
FIG. 22 is a schematic diagram that illustrates the sixth preferred embodiment of an imaging lens according to the present invention.
Figure 25:
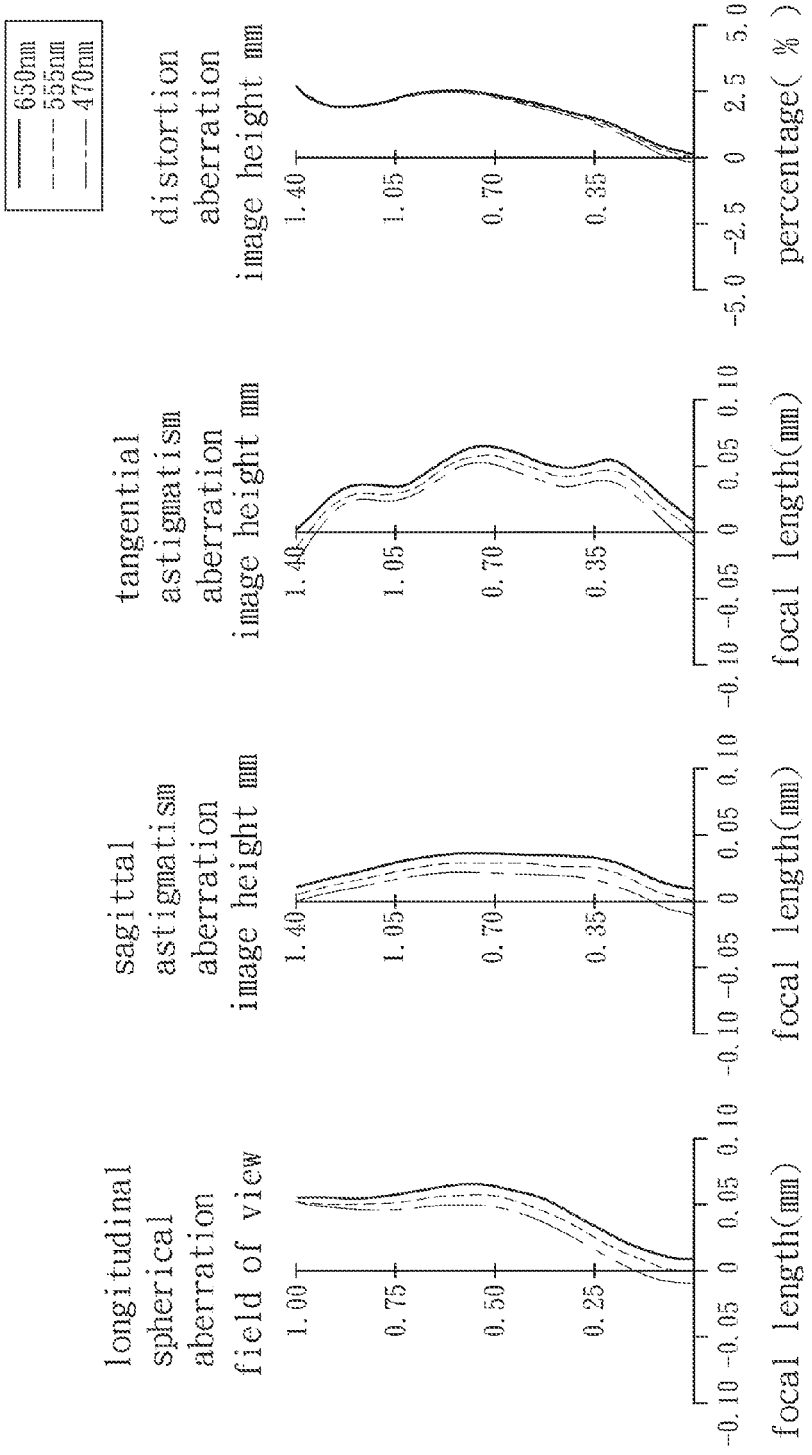
FIGS. 25(a) to 25(d) show different optical characteristics of the imaging lens of the sixth preferred embodiment.

FIG. 22 illustrates the sixth preferred embodiment of an imaging lens 10 of the present invention, which has a configuration similar to the first preferred embodiment.

Shown in FIG. 23 is a table that lists values of some optical parameters corresponding to the surfaces 31-61, 32-62 of the sixth preferred embodiment. The imaging lens 10 has an overall system focal length of 2.03 mm, an HFOV of 33.42°, and a system length of 2.50 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are as follows:

$G_{aa}/T_2=3.20$ $BFL/G_{aa}=1.61$ $EFL/T_2=11.26$ $T_1/G_{12}=1.83$

FIGS. 25(a) to 25(d) show simulation results corresponding to longitudinal spherical aberration, sagittal astigmatism aberration, tangential astigmatism aberration, and distortion aberration of the sixth preferred embodiment, respectively. It can be understood from FIGS. 25(a), 25(b), 25(c) and 25(d) that the sixth preferred embodiment is likewise able to achieve a relatively good optical performance even with the system length reduced down to below 3 mm.

Figure 26:
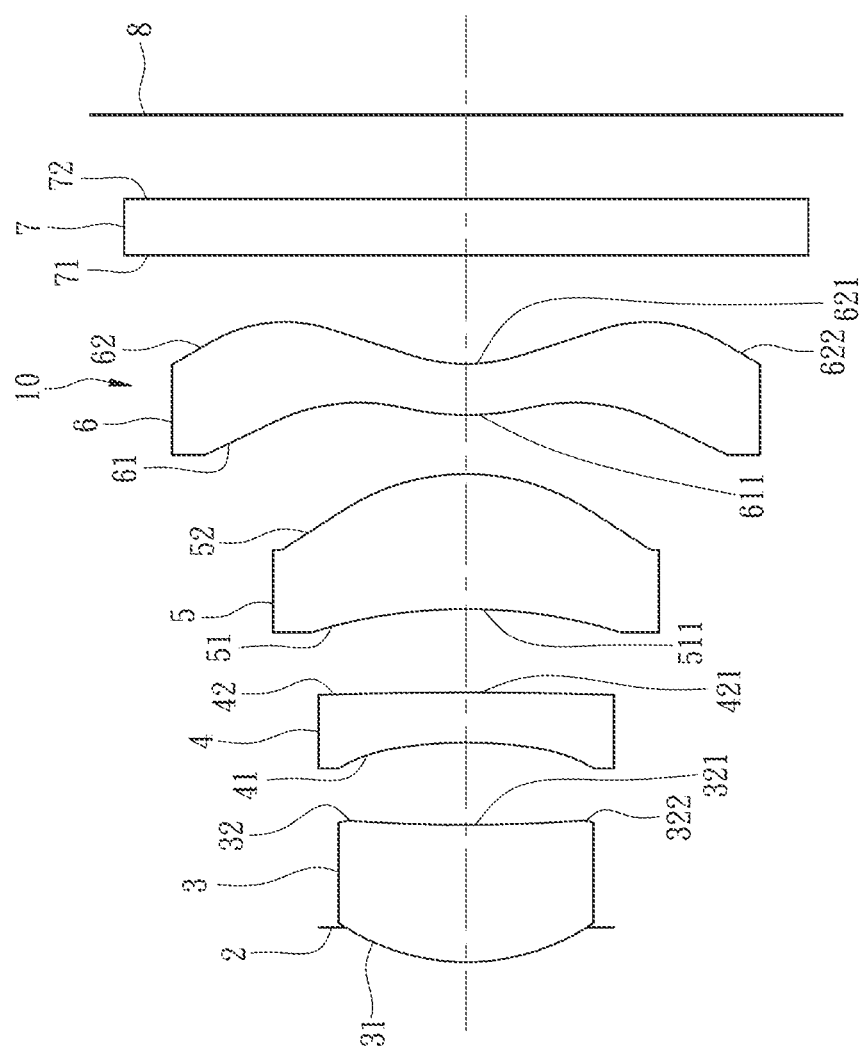
FIG. 26 is a schematic diagram that illustrates the seventh preferred embodiment of an imaging lens according to the present invention.
Figure 29:
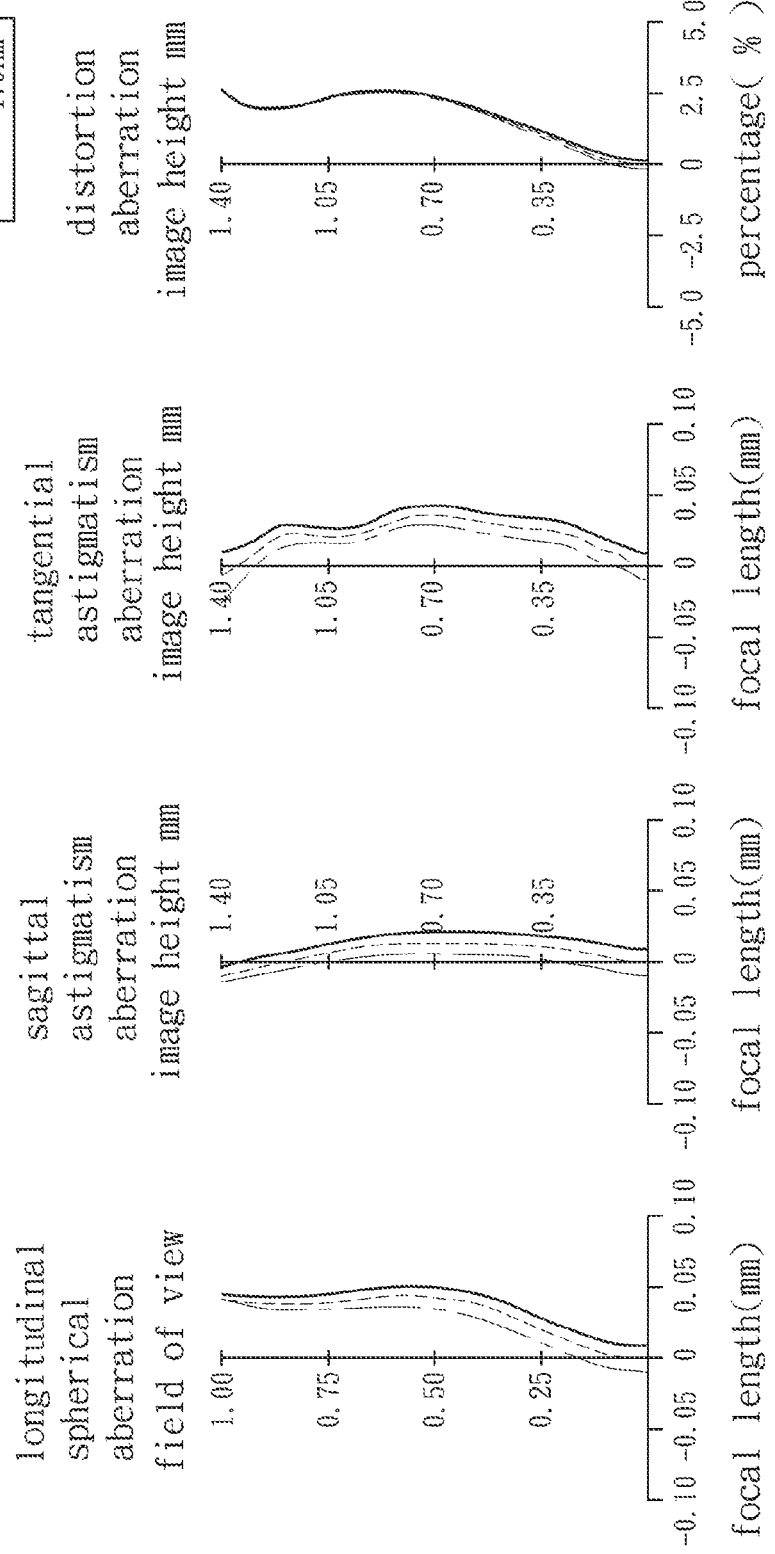
FIGS. 29(a) to 29(d) show different optical characteristics of the imaging lens of the seventh preferred embodiment.

Referring to FIG. 26, the difference between the first and seventh preferred embodiments of the imaging lens 10 of the present invention resides in that:

The image-side surface 32 of the first lens element 3 is a curved surface that has a concave portion 321 in a vicinity of the optical axis (I) and a convex portion 322 in a vicinity of a periphery of the first lens element 3.

Shown in FIG. 27 is a table that lists values of some optical parameters corresponding to the surfaces 31-61, 32-62 of the seventh preferred embodiment. The imaging lens 10 has an overall system focal length of 2.06 mm, an HFOV of 33.14°, and a system length of 2.55 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are as follows:

$G_{aa}/T_2=2.70$ $BFL/G_{aa}=1.61$ $EFL/T_2=10.91$ $T_1/G_{12}=3.92$

FIGS. 29(a) to 29(d) show simulation results corresponding to longitudinal spherical aberration, sagittal astigmatism aberration, tangential astigmatism aberration, and distortion aberration of the seventh preferred embodiment, respectively. It can be understood from FIGS. 29(a), 29(b), 29(c) and 29(d) that the seventh preferred embodiment is likewise able to achieve a relatively good optical performance even with the system length reduced down to below 3 mm.

Figure 30:
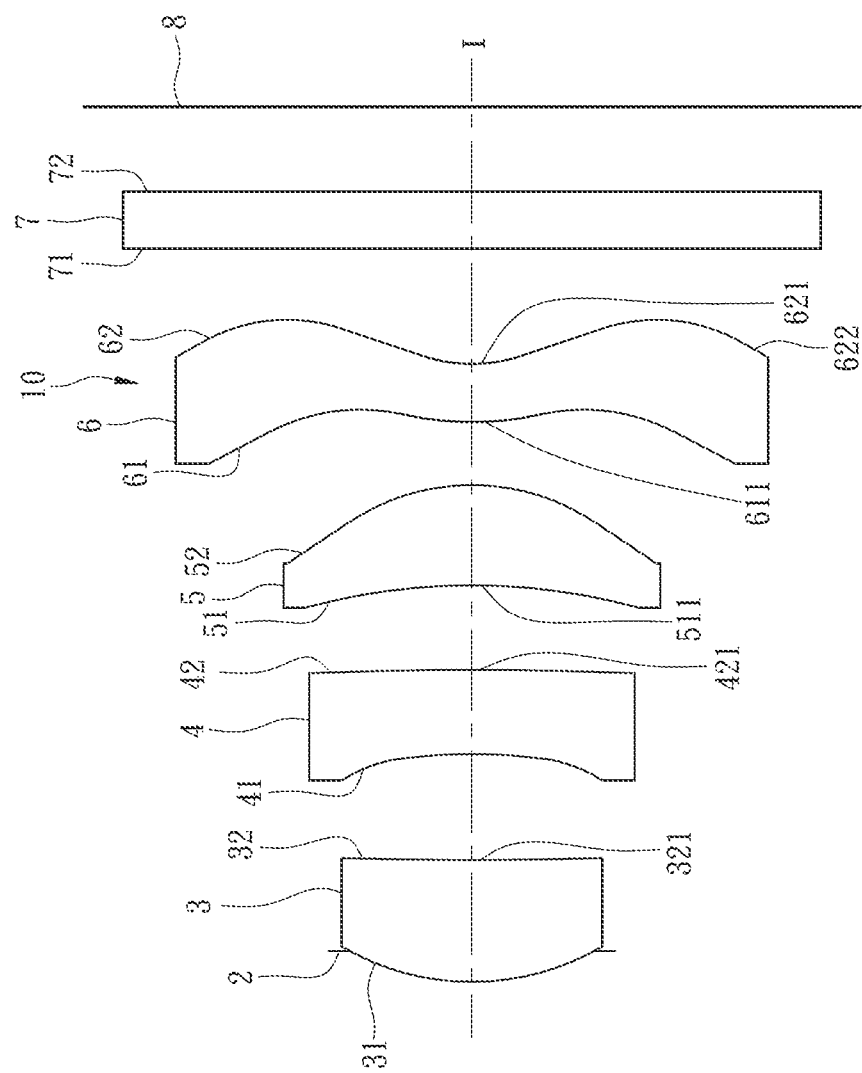
FIG. 30 is a schematic diagram that illustrates the eighth preferred embodiment of an imaging lens according to the present invention.
Figure 33:
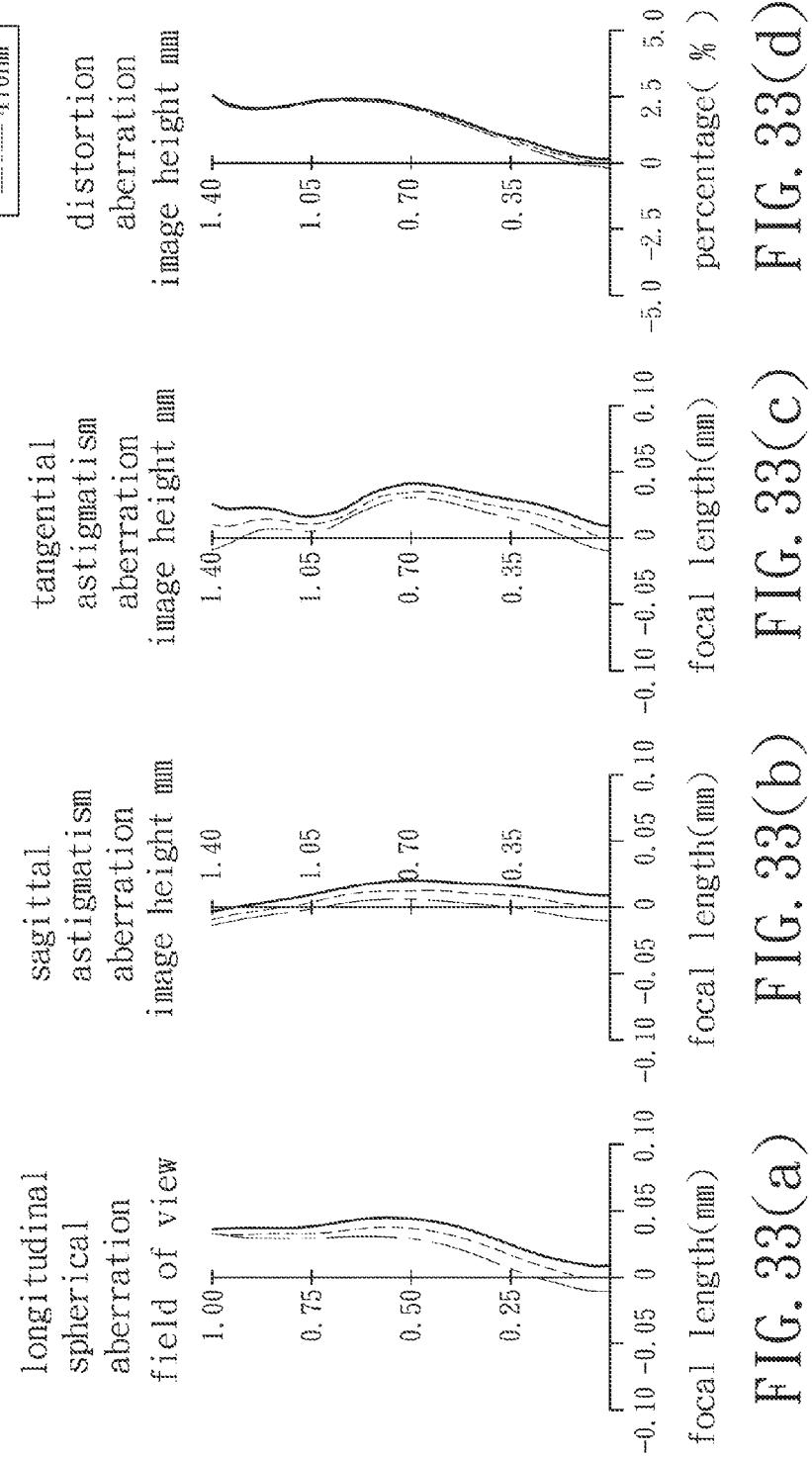
FIGS. 33(a) to 33(d) show different optical characteristics of the imaging lens of the eighth preferred embodiment.

FIG. 30 illustrates the eighth preferred embodiment of an imaging lens 10 of the present invention, which has a configuration similar to the first preferred embodiment.

Shown in FIG. 31 is a table that lists values of some optical parameters corresponding to the surfaces 31-61, 32-62 of the eighth preferred embodiment. The imaging lens 10 has an overall system focal length of 1.97 mm, an HFOV of 34.38°, and a system length of 2.46 mm.

Shown in FIG. 32 is a table that lists values of some optical parameters of the aforementioned optical relationship (1) corresponding to the eighth preferred embodiment.

Relationships among some of the aforementioned optical parameters corresponding to the eighth preferred embodiment are as follows:

$G_{aa}/T_2 \le 1.66$ $BFL/G_{aa} 1.61$ $EFL/T_2 = 6.50$ $T_1/G_{12} = 2.46$

FIGS. 33(a) to 33(d) show simulation results corresponding to longitudinal spherical aberration, sagittal astigmatism aberration, tangential astigmatism aberration, and distortion aberration of the eighth preferred embodiment, respectively. It can be understood from FIGS. 33(a), 33(b), 33(c) and 33(d) that the eighth preferred embodiment is likewise able to achieve a relatively good optical performance even with the system length reduced down to below 3 mm.

Shown in FIG. 34 is a table that lists the aforesaid relationships among some of the aforementioned optical parameters corresponding to the preferred embodiments for comparison. When the optical parameters of the imaging lens 10 according to this invention satisfy the following optical relationships, the optical performance is still relatively good even when the system length is reduced down to below 3 mm:

$G_{aa}T_2 \le 3.5$ (2)

$T_1/G_{12} \le 4.1$ (3)

$1.6 \le BFL/G_{aa}$ (4)

$5 \le EFL/T_2 \le 16$ (5)

When the imaging lens 10 satisfies optical relationship (2), $G_{aa}$ and $T_2$ fall within an appropriate length range. Otherwise, $T_2$ may be too small, which may render manufacturing of the imaging lens 10 difficult. Preferably, the imaging lens 10 satisfies the relationship of $G_{aa}/T_2 \le 3.2$.

When the imaging lens 10 satisfies optical relationship (3), $G_{12}$ and $T_1$ fall within an appropriate length range. Otherwise, $T_1$ may be too large and not favor reduction of the system length of the imaging lens 10.

When the imaging lens 10 satisfies optical relationship (4), $G_{aa}$ and BFL fall within an appropriate length range. Otherwise, BFL may be too small, which may render manufacturing of the imaging lens 10 difficult. When BFL/$G_{aa}$ ranges between 1.6 and 2.1, system length of the imaging lens 10 may be reduced with good optical performance, but BFL is relatively small and $G_{aa}$ is relatively large. Upon consideration of balance between the system length of the imaging lens 10 and manufacturing technique, the imaging lens 10 is preferable to satisfy the relationship of $2.1 \le BFL/G_{aa}$.

When the imaging lens 10 satisfies optical relationship (5), it favors reduction of the system length of the imaging lens 10. When $EFL/T_2$ is smaller than 5, EFL may be too small, which may render manufacturing of the imaging lens 10 difficult. When $EFL/T_2$ is larger than 16, EFL may be too large and not favor reduction of the system length of the imaging lens 10. When $5 \le EFL/T_2 < 6$, focal length may be somewhat small and $T_2$ may be somewhat large. Since the second lens element 4 is smaller than the third lens element 5 and the fourth lens element 6 in the arrangement of the system length of the imaging lens 10, thickness of the second lens element 4 may be reduced. However, a relatively large $T_2$ does not favor adjustment of thickness of other lens elements, and a relatively small EFL may render manufacturing of the imaging lens 10 difficult. Although system length of the imaging lens 10 may be reduced with good optical performance when $5 \le EFL/T_2 < 6$, it may result in difficulty of manufacturing technique and thickness adjustment of the lens elements. Hence, the imaging lens 10 is preferable to satisfy $6 \le EFL/T_2 \le 13.5$.

To sum up, effects and advantages of the imaging lens 10 according to the present invention are described hereinafter.

1. By virtue of the positive refractive power and the convex object-side surface 31 of the first lens element 3, the first lens element 3 is able to achieve a good light converging capability and to distribute partly the refractive power of the second lens element 4. Through the concave portion 321 of the image-side surface 32 of the first lens element 3 that is disposed in the vicinity of the optical axis (I), the astigmatism may be corrected.

2. By virtue of the negative refractive power and the convex portion 421 of the image-side surface 42 of the second lens element 4 that is disposed in the vicinity of the optical axis (I), as well as the concave portion 511 of the object-side surface 51 of the third lens element 5 that is disposed in the vicinity of the optical axis (I), aberration and field curvature may be effectively reduced or eliminated.

3. The designs of the concave portion 621 and the convex portion 622 of the image-side surface 62, and the convex portion 611 of the object-side surface 61 of the fourth lens element 6 favor reducing field curvature, optical aberration, and chief ray angle, and result in higher system sensitivity.

4. Through design of the relative optical parameters, such as $G_{aa}/T_2$, $T_1/G_{12}$, $BFL/G_{aa}$, and $EFL/T_2$, optical aberration, such as spherical aberration, may be reduced or eliminated. Through further design and arrangement of the concave and convex portions of the lens elements 3-6, even when the system length is reduced, optical aberrations may still be reduced or eliminated, resulting in relatively good optical performance.

5. Through the aforesaid eight preferred embodiments, it can be appreciated that the system length of this invention may be reduced down to below 3 mm, so as to facilitate developing thinner relevant products and promote economical benefits.

Figure 35:
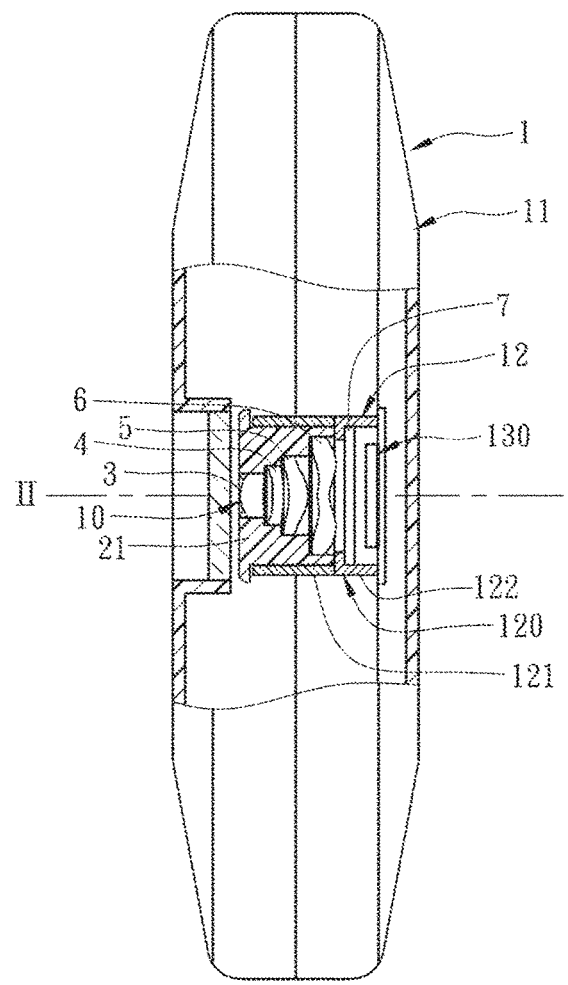
FIG. 35 is a schematic partly sectional view to illustrate a first exemplary application of the imaging lens of the present invention.

Shown in FIG. 35 is a first exemplary application of the imaging lens 10, in which the imaging lens 10 is disposed in a housing 11 of an electronic apparatus 1 (such as a mobile phone), and forms a part of an imaging module 12 of the electronic apparatus 1. The imaging module 12 includes a barrel 21 on which the imaging lens 10 is disposed, a seat unit 120 on which the barrel 21 is disposed, and an image sensor 130 disposed at the image plane 8 (see FIG. 1) and operatively associated with the imaging lens 10 for capturing images.

The seat unit 120 includes a first seat portion 121 in which the barrel 21 is disposed, and a second seat portion 122 interposed between the first seat portion 121 and the image sensor 130. The barrel 21 and the first seat portion 121 of the seat unit 120 extend along an axis (II), which coincides with the optical axis (I) of the imaging lens 10.

Figure 36:
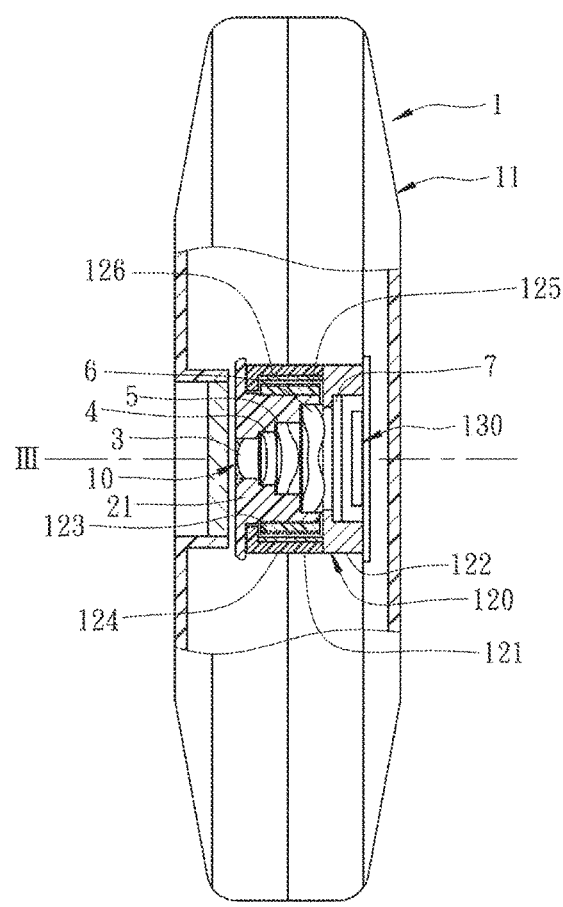
FIG. 36 is a schematic partly sectional view to illustrate a second exemplary application of the imaging lens of the present invention.

Shown in FIG. 36 is a second exemplary application of the imaging lens 10. The difference between the first and second exemplary applications resides in that, in the second exemplary application, the seat unit 120 is configured as a voice-coil motor (VCM), and the first seat portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 7 of the imaging lens 10 is disposed at the second seat portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization. Furthermore, application and configuration of the imaging lens 10 are not limited to such.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An imaging lens comprising first, second, third, and fourth lens elements arranged from an object side to an image side in the given order, each of the first, second, third, and fourth lens elements having an object-side surface facing toward the object side and an image-side surface facing toward the image side, wherein:
    the image-side surface of the first lens element comprises a concave portion in a vicinity of a periphery of the first lens element;
    the image-side surface of the second lens element comprises a convex portion in a vicinity of an optical axis of the second lens element;
    the third lens element has a positive refractive power and the object-side surface of the third lens element comprises a concave portion in a vicinity of an optical axis of the third lens element;
    the object-side surface of the fourth lens element comprises a convex portion in a vicinity of an optical axis of the fourth lens element;
    the imaging lens has a fixed focal length and does not include any lens element with refractive power other than the first, second, third, and fourth lens elements; and
    the imaging lens satisfies $1.30 \leq G_{aa}/(G_{12}+G_{23}) \leq 1.83$, where $G_{aa}$ represents a sum of a distance between the image-side surface of the first lens element and the object-side surface of the second lens element at the optical axis, a distance between the image-side surface of the second lens element and the object-side surface of the third lens element at the optical axis, and a distance between the image-side surface of the third lens element and the object-side surface of the fourth lens element at the optical axis,
    $G_{12}$ represents a distance between the image-side surface of the first lens element and the object-side surface of the second lens element at the optical axis,
    $G_{23}$ represents a distance between the image-side surface of the second lens element and the object-side surface of the third lens element at the optical axis.

2. The imaging lens as claimed in claim 1, wherein the imaging lens further satisfies $9.2 \leq TTL/T_4$, where
    $T_4$ represents a distance between the object-side surface and the image-side surface of the fourth lens element at the optical axis, and
    TTL represents a distance between the object-side surface of the first lens element and an image plane of the imaging lens at the optical axis.

3. The imaging lens as claimed in claim 1, wherein the imaging lens further satisfies $1.3 \leq T_1/T_4$, where
    $T_1$ represents a distance between the object-side surface and the image-side surface of the first lens element at the optical axis, and
    $T_4$ represents a distance between the object-side surface and the image-side surface of the fourth lens element at the optical axis.

4. The imaging lens as claimed in claim 1, wherein the imaging lens further satisfies $0.5 \leq G_{12}/G_{23} \leq 1.8$.

5. The imaging lens as claimed in claim 1, wherein the imaging lens further satisfies $1.7 \leq T_1/G_{12} \leq 4.5$, where
    $T_1$ represents a distance between the object-side surface and the image-side surface of the first lens element at the optical axis.

6. The imaging lens as claimed in claim 1, wherein the imaging lens further satisfies $1.8 \leq G_{aa}/G_{12} \leq 4.2$.

7. The imaging lens as claimed in claim 1, wherein the imaging lens satisfies $5.2 \leq TTL/F_3$, where
    TTL represents a distance between the object-side surface of the first lens element and an image plane of the imaging lens at the optical axis, and
    $T_3$ represents a distance between the object-side surface and the image-side surface of the third lens element at the optical axis.

8. The imaging lens as claimed in claim 1, wherein the imaging lens satisfies $T_4/G_{34} \leq 2.7$, where
    $T_4$ represents a distance between the object-side surface and the image-side surface of the fourth lens element at the optical axis, and
    $G_{34}$ represents a distance between the image-side surface of the third lens element and the object-side surface of the fourth lens element at the optical axis.

9. The imaging lens as claimed in claim 1, wherein the imaging lens satisfies $4.8 \leq TTL/T_1 \leq 7.5$, where
TTL represents a distance between the object-side surface of the first lens element and an image plane of the imaging lens at the optical axis, and
$T_1$ represents a distance between the object-side surface and the image-side surface of the first lens element at the optical axis.

10. The imaging lens as claimed in claim 1, wherein the imaging lens satisfies $4.3 \leq TTL/(G_{12}+G_{23}+G_{34}) \leq 8.5$, where
TTL represents a distance between the object-side surface of the first lens element and an image plane of the imaging lens at the optical axis, and
$G_{34}$ represents a distance between the image-side surface of the third lens element and the object-side surface of the fourth lens element at the optical axis.

11. The imaging lens as claimed in claim 10, wherein the imaging lens satisfies $0.85 \leq T_3/T_4$, where
$T_3$ represents a distance between the object-side surface and the image-side surface of the third lens element at the optical axis, and
$T_4$ represents a distance between the object-side surface and the image-side surface of the fourth lens element at the optical axis.

12. The imaging lens as claimed in claim 1, wherein the imaging lens satisfies $0.5 \leq G_{aa}/T_3 \leq 1.53$, where
$T_3$ represents a distance between the object-side surface and the image-side surface of the third lens element at the optical axis.

13. The imaging lens as claimed in claim 1, wherein the imaging lens satisfies $5.0 \leq ALT/T_4$, where
ALT represents a sum of the thickness of all four lens elements along the optical axis, and
$T_4$ represents a distance between the object-side surface and the image-side surface of the fourth lens element at the optical axis.

14. The imaging lens as claimed in claim 1, wherein the imaging lens satisfies $0.72 \leq G_{aa}/T_1 \leq 1.7$, where
$T_1$ represents a distance between the object-side surface and the image-side surface of the first lens element at the optical axis.

15. An electronic apparatus comprising:
a housing; and
an imaging module disposed in the housing, and including an imaging lens as claimed in claim 1, a barrel on which the imaging lens is disposed, a seat unit on which the barrel is disposed, and an image sensor disposed at the image side and operatively associated with the imaging lens for capturing images.

16. The imaging lens as claimed in claim 12, wherein the imaging lens satisfies $ALT/T_3 \leq 4.6$, where
ALT represents a sum of the thickness of all four lens elements along the optical axis.

17. The imaging lens as claimed in claim 1, wherein the imaging lens satisfies $0.8 \leq T_1/(G_{12}+G_{23}) \leq 2.5$, where
$T_1$ represents a distance between the object-side surface and the image-side surface of the first lens element at the optical axis.

* * * * *

UNITED STATES PATENT AND TRADEMARK OFFICE
CERTIFICATE OF CORRECTION

PATENT NO. : 10,191,247 B2
APPLICATION NO. : 14/942428
DATED : January 29, 2019
INVENTOR(S) : Kuo-Wen Chang, Poche Lee and Wei-Yu Lo Page 1 of 1

It is certified that error appears in the above-identified patent and that said Letters Patent is hereby corrected as shown below:

In the Claims

In Claim 7, Column 12, Line 53, replace "$5.2 \leq TTL/F_3$" with -- $5.2 \leq TTL/T_3$ --.

Signed and Sealed this
Ninth Day of April, 2019

Andrei Iancu
*Director of the United States Patent and Trademark Office*